(12) United States Patent
Lovisa

(10) Patent No.: US 9,916,610 B2
(45) Date of Patent: Mar. 13, 2018

(54) SERVICE IMPLEMENTATION

(71) Applicant: Noel William Lovisa, Annadale (AU)

(72) Inventor: Noel William Lovisa, Annadale (AU)

( * ) Notice: Subject to any disclaimer, the term of this patent is extended or adjusted under 35 U.S.C. 154(b) by 469 days.

(21) Appl. No.: 14/451,624

(22) Filed: Aug. 5, 2014

(65) Prior Publication Data
US 2015/0032573 A1 Jan. 29, 2015

Related U.S. Application Data

(63) Continuation of application No. 10/533,577, filed as application No. PCT/AU03/01473 on Nov. 6, 2003, now Pat. No. 8,832,178.

(51) Int. Cl.
*G06Q 30/06* (2012.01)
*H04L 29/08* (2006.01)
*G06Q 10/00* (2012.01)

(52) U.S. Cl.
CPC ......... *G06Q 30/0623* (2013.01); *G06Q 10/00* (2013.01); *H04L 67/34* (2013.01)

(58) Field of Classification Search
CPC ..... H04L 67/34; H04L 12/14; H04L 41/0213; H04L 41/0233; G06Q 30/0623; G06Q 10/00
USPC ........................................................ 709/203
See application file for complete search history.

(56) References Cited

U.S. PATENT DOCUMENTS

| | | | |
|---|---|---|---|
| 5,517,584 A | 5/1996 | Jennings | |
| 5,524,253 A | 6/1996 | Pham et al. | |
| 5,553,282 A | 9/1996 | Parrish et al. | |
| 5,867,707 A | 2/1999 | Nishida et al. | |
| 5,913,061 A | 6/1999 | Gupta et al. | |
| 6,014,147 A | 1/2000 | Politis et al. | |
| 6,094,688 A | 7/2000 | Mellen-Garnett et al. | |
| 6,096,095 A | 8/2000 | Halstead | |
| 6,226,692 B1 | 5/2001 | Miloushev et al. | |
| 6,249,905 B1 | 6/2001 | Yoshida et al. | |

(Continued)

FOREIGN PATENT DOCUMENTS

| | | |
|---|---|---|
| EP | 0817032 A3 | 1/1998 |
| EP | 1211598 A1 | 6/2002 |

(Continued)

OTHER PUBLICATIONS

PCT Publication No. WO2004/042640A1, dated May 21, 2004, including International Search Report dated Dec. 12, 2003, regarding PCT/AU2003/001473.

(Continued)

*Primary Examiner* — Tu Nguyen
(74) *Attorney, Agent, or Firm* — JD Harriman Foundation Law Group

(57) ABSTRACT

The present invention provides a method of allowing a user to obtain a service using a processing system. The method utilizes components each of which corresponds to a respective service portion provided by a respective entity. The method includes causing the processing system to determine a combination of components defining a sequence of service portions, in accordance with input commands received from the user. The processing system then implements the components in accordance with the component combination, thereby causing the sequence of service portions to be performed, such that the desired service to be performed.

25 Claims, 22 Drawing Sheets

(56) References Cited

U.S. PATENT DOCUMENTS

| | | |
|---|---|---|
| 6,256,771 B1 | 7/2001 | O'Neil et al. |
| 6,275,977 B1 | 8/2001 | Nagai et al. |
| 6,401,114 B1 | 6/2002 | Jenkins |
| 6,405,361 B1 | 6/2002 | Broy et al. |
| 6,434,738 B1 | 8/2002 | Arnow |
| 6,456,986 B1 | 9/2002 | Boardman et al. |
| 6,517,587 B2 | 2/2003 | Satyavolu et al. |
| 6,718,389 B2 | 4/2004 | Navarre et al. |
| 6,721,747 B2 | 4/2004 | Lipkin |
| 6,973,638 B1 | 12/2005 | Gangopadhyay et al. |
| 7,024,450 B1 | 4/2006 | Deo et al. |
| 7,139,728 B2 | 11/2006 | Rigole |
| 7,150,000 B1 | 12/2006 | Feldman |
| 7,154,638 B1 | 12/2006 | Lapstun et al. |
| 7,171,460 B2 | 1/2007 | Kalavade et al. |
| 7,206,846 B1 | 4/2007 | Dini et al. |
| 7,227,873 B2 | 6/2007 | Lehtimaki |
| 7,266,582 B2 | 9/2007 | Stelting |
| 2001/0044928 A1 | 11/2001 | Akaike et al. |
| 2001/0049632 A1 | 12/2001 | Rigole |
| 2001/0051928 A1 | 12/2001 | Brody |
| 2001/0056362 A1 | 12/2001 | Hanagan et al. |
| 2002/0016779 A1 | 2/2002 | Roll et al. |
| 2002/0047865 A1 | 4/2002 | Bozionek et al. |
| 2002/0055956 A1 | 5/2002 | Krasnoiarov et al. |
| 2002/0059078 A1 | 5/2002 | Valdes et al. |
| 2002/0060566 A1 | 5/2002 | Debbins et al. |
| 2002/0087341 A1 | 7/2002 | Kappel et al. |
| 2002/0120555 A1 | 8/2002 | Lerner |
| 2002/0138582 A1 | 9/2002 | Chandra et al. |
| 2002/0143819 A1 | 10/2002 | Han et al. |
| 2002/0178211 A1 | 11/2002 | Singhal et al. |
| 2003/0060896 A9 | 3/2003 | Hulai et al. |
| 2003/0115309 A1* | 6/2003 | Mann ............... G06F 9/4431 709/223 |
| 2003/0120432 A1 | 6/2003 | Zhou et al. |
| 2003/0158915 A1 | 8/2003 | Gebhart |
| 2003/0236745 A1* | 12/2003 | Hartsell ............ G06Q 20/102 705/40 |
| 2004/0030627 A1 | 2/2004 | Sedukhin |
| 2004/0064830 A1 | 4/2004 | Irving et al. |
| 2004/0117759 A1 | 6/2004 | Rippert, Jr. et al. |

FOREIGN PATENT DOCUMENTS

| | | |
|---|---|---|
| EP | 1246054 A1 | 10/2002 |
| JP | H11175329 A | 7/1999 |
| JP | H11316675 A | 11/1999 |
| JP | 2001195372 A | 7/2001 |
| JP | 2001325103 A | 11/2001 |
| JP | 003005977 A | 1/2003 |
| JP | 2003140895 A | 5/2003 |
| JP | 2003241966 A | 8/2003 |
| JP | 2013254272 A | 12/2013 |
| WO | 9824020 A2 | 6/1998 |
| WO | 9839698 A2 | 9/1998 |
| WO | 9945464 A2 | 9/1999 |
| WO | 9946689 A1 | 9/1999 |
| WO | 0007128 | 2/2000 |
| WO | 0108002 A2 | 2/2001 |
| WO | 0109721 A2 | 2/2001 |
| WO | 0173625 | 10/2001 |
| WO | 0175593 A2 | 10/2001 |
| WO | 0186372 A2 | 11/2001 |
| WO | 0217074 A1 | 2/2002 |
| WO | 02069086 | 9/2002 |
| WO | 2004042639 A1 | 5/2004 |

OTHER PUBLICATIONS

A United Approach for the integration of Distributed Heterogeneous Software Components Authors: Rajeev R Raje, Mikhail Auguston, Barrett R Bryant, Andrew M Olson and Carol Burt Publication data: Proceedings of the Monterey Workshop on Engineering Automation for Software Intensive System Integration, , Jun. 1, 2001.

An Architecture for the UniFrame Resource Discovery Service Authors: Nanditha N. Siram, Rajeev R. Raje, Andrew M. Olson, Barrett R. Bryant, Carol C. Burt, and Mikhail Augustan Publication data: Software Engineering and Middleware; [Lecture Notes in Computer Science], , May 20, 2002, Springer Berlin Heidelberg, Berlin, Heidelberg.

Flexible multimedia system architecture with adaptive QoS guarantee functions Authors: Hashimoto K, Shibata Y, Shiratori N Publication data: Parallel and Distributed Systems, 2000. Proceedings. Seventh Internati onal Conference on Iwate, Japan Jul. 4-7, 2000, , Jul. 7, 2000; Jul. 4, 2000-Jul. 7, 2000, Los Alamitos, CA, USA, IEEE Comput. Soc, US Source info: pp. 119-126.

A Taxonomy of Obfuscating Transformations Authors: Collberg C, Thomborson C, Low D Publication data: Technical Report Department of Computer Science University Ofauckland, , Jul. 1, 1997, XX, XX Source info: Nr: 148, pp. 1-36.

Reducing risks of widespread faults and attacks for commercial software applications: towards diversity of software components Authors: Mont M C, Baldwin A, Beres Y, Harrison K, Sadler M, Shiu S Publication data: Proceedings of the 26th. Annual International Computer Software and Applications Conference. Compsac 2002. Oxford, England, Aug. 26-29, 2002.

Component search service and deployment of distributed applications Authors: Kebbal D, Bernard G Publication data: Distributed Objects and Applications, 2001. DOA '01. Proceedings. 3rd International Symposium on Sep. 17-20 2001, , Sep. 17, 2001; Sep. 17, 2001-Sep. 20, 2001, Piscataway, NJ, USA, IEEE Source info: pp. 125-134.

A Design of Media Element Agent in Flexible Network Layer Authors: Takahashi Akiko, Suganuma Takuo, Kinoshita Tetsuo, Shiratori Norio Publication data: Multimedia Communication and Distributed Processing Workshop Papers vol. 2002, No. 15, Oct. 2002, P.183-188, Information Processing Society of Japan.

H.R. Frost and M.R. Cutkosky: "Design for manufacturability via, agent interaction" Proceedings of the 1996 ASME Design, Engineering Technical Conferences and Computers in Engineering, Conference [Online] Aug. 1996, pp. 1-12.

Naoki Imai, Manabu Isomura, Hiroki Horiuchi: Service Migration Mechanism for Real-Time Communications in Ubiquitous Resources Environment, The Institute of Electronica Information and Communication Engineers, Technical Report of IEICE, IN2003-203, Feb. 2004, KDDI R&D Laboratories Inc., Feb. 1, 2015 Ohara, Kamifukuoka-shi, Saitama, 356-8502 Japan, email: naoki.isomura@kddilabs.jp.

* cited by examiner

SERVICE IMPLEMENTATION

CROSS-REFERENCE TO RELATED APPLICATIONS

This Application is a continuation of U.S. patent application Ser. No. 10/533,577, filed Dec. 9, 2005, entitled "SERVICE IMPLEMENTATION," which was a 371 of PCT/AU03/01473, filed on Nov. 6, 2003, which claimed benefit of U.S. Provisional Patent Application Ser. No. 60/424,859, filed on Nov. 8, 2002, the contents of each of which are hereby incorporated by reference in their entireties.

BACKGROUND OF THE INVENTION

The present invention relates to a method and apparatus for performing a service, and in particular, to performing a service using components, each of which corresponds to a respective service portion.

DESCRIPTION OF THE PRIOR ART

The reference to any prior art in this specification is not, and should not be taken as, an acknowledgement or any form of suggestion that the prior art forms part of the common general knowledge.

Currently most industries utilise a degree of specialisation. However, the degree to which this is achieved, particularly in the service industries, such as accountancy, the legal profession or the like, is limited.

For example, when obtaining accountancy services, it is usual for a customer to establish a relationship with a specific accountant company or individual that can provide all the services required by the customer. This is achieved by having the accountant provide a wide range of services that will allow the accountant to obtain sufficient customers to support the practice. Thus, larger accountancy firms will generally provide a greater range of services than smaller firms, to allow the larger firms to support a larger customer base, and hence make a greater profit.

In general, when a customer wishes to obtain accountancy services, the customer will examine the services provided by a range of different firms and/or individuals, and then select a respective one to provide all their accountancy needs.

However, this suffers from a number of drawbacks. In particular, it is necessary for the accountancy firms to have expertise in a wide range of areas in order to be able to compete within the market place. This requires firms to therefore generalise their practice.

In a large accountancy firm, this is overcome to a certain extent by having individuals within the firm practice in specific areas, with work being transferred internally within the firm to allow a range of services to be performed. Alternatively, in the case of smaller firms, outsourcing can be performed, to allow specific tasks to be performed by more experienced contractors, or the like.

However, this procedure suffers from a number of drawbacks. Primarily, this requires that individuals working within the firms are capable of a large degree of generalisation, with many individuals in the service area each attempting to provide many often disseparate services. As a result, there is little opportunity for any one individual within the industry to specialise on providing a narrow range of well defined services.

This lack of specialisation in turn leads to inefficiencies within the service industry. In particular, the service industries often suffer from complexity limits due to the fact that as the level of complexity rises, it becomes impossible for one person or entity to understand all aspects of a particular service requirement. Furthermore, generalists will typically perform tasks far less efficiently than specialists, not least because they are less familiar with the processes needed to perform the tasks.

Furthermore, the manner in which defined tasks are implemented is usually invisible to the customer, who is therefore often unaware of who is performing specific work on a project or the like. This removes control from the customer, preventing the customer from specifying the individuals that should be performing respective portions of the defined task.

It will be appreciated that this applies to almost any service industry to a greater or lesser degree, but is most pronounced in service industries that involve the manipulation of data or other information.

SUMMARY OF THE PRESENT INVENTION

In a first broad form the present invention provides a method of allowing a user to obtain a service using a processing system, the method utilising components each component corresponding to a respective service portion provided by a respective entity, the method including causing the processing system to:
  a) Determine a combination of components in accordance with input commands received from the user, the defined component combination defining a sequence of service portions; and,
  b) Implement the components in accordance with the component combination, thereby causing the sequence of service portions to be performed, such that the desired service to be performed.

The base station is usually coupled to one or more end stations via a communications network, the method including allowing the user to use the end station to:
  a) Select one or more of the components; and,
  b) Define a component combination using the selected components.

The method typically includes causing the base station to:
  a) Receive a component request from the end station;
  b) Transfer an indication of one or more components to the end station in accordance with the request, thereby allowing the user to select one or more of the components.

The method may include causing the base station to:
  a) Receive a component selection from the end station, the component selection indicating one or more selected components; and,
  b) Transfer details of the selected components to the end station in response to the request, thereby allowing the user to define the component combination.

The base station can include a store for storing component specifications representing the service portion provided by a respective component and, a processor, in which case the method can include causing the processor to:
  a) Access the component specifications stored in the store; and,
  b) Provide an indication of the services provided by the components to the end station, thereby allowing the user to select respective ones of the components.

At least some of the components including one or more ports, the store being further adapted to store port specifications, each port specification indicating any information to be received by or output from the port, the method including causing the processor to:
  a) Access the port specifications stored in the store; and,
  b) Provide an indication of the information to the end station, thereby allowing the user to select the components.

The method can include allowing the user to define the component combination by connecting the ports of the selected components using the end station.

The method may include connecting ports in accordance with the port specifications.

The method typically includes causing the base station and/or the end station to:
  a) Generate a graphical representation of the selected components; and,
  b) Manipulate the graphical representation in response to input commands received from the user to thereby define the component combination.

The method typically further includes causing the base station to:
  a) Obtain a graphical representation of the selected components;
  b) Transfer the graphical representations to the end station.

The method preferably includes causing each of the entities to implement the respective service portions in turn to thereby provide the service.

The components can be implemented by component processing systems, the method of implementing the combined components including:
  a) Generating a service request for each component in the component combination; and,
  b) Transferring the service request to each entity via the communications network, each entity being adapted to respond to the service request to implement the data manipulation embodied by the respective component.

The method may include:
  a) Determining any information required by the components; and,
  b) Providing the information in the service request.

Each service request can include an indication of the interconnections for each of the ports of the respective component.

The method typically includes causing each component processing system to:
  a) Implement one or more respective component instances in accordance with the received service request; and,
  b) Cause each component instance to:
    i) Interact with other components in accordance with the interconnections defined n the service request; and,
    ii) Perform any required information manipulations.

The method generally includes causing each component processing system to:
  a) Implement a respective agent associated with each port; and,
  b) Cause each agent to cooperate with an agent of another component in accordance with the defined interconnections, to thereby allow data to be transferred between the ports.

At least some of the services can be adapted to manipulate information, the entity being adapted to perform the service by:
  a) Receiving the information to be manipulated at a ports;
  b) Perform the manipulation; and,
  c) Provide the manipulated information at one of the ports.

The method may include transferring the manipulated information to one or more components in accordance with the defined component combination.

The method can include causing the base station to:
  a) Determine a performance information, the performance information being representative of one or more criteria regarding the implementation of the components by the respective entities;
  b) Provide the performance information to the user, the user selecting the components in accordance with the performance information.

The performance information can include at least one of:
  a) An indication of the entity implementing the component;
  b) An indication of the geographical location of the entity;
  c) An indication of the duration for implementing the component;
  d) An indication of a cost associated with implementing the respective component; and,
  e) A rating, the rating being indicative of the success of the component.

The method may include:
  a) Providing a number of different components for performing equivalent service portions, the different components being provided by different entities; and,
  b) Inducing competition between the entities to thereby drive improvement of the components.

The method typically includes generating revenue by charging a fee for the use of each component.

The method can include:
  a) Providing at least some of the revenue to the entity implementing the respective component; and,
  b) Having an operator of the base station retain at least some of the revenue.

In a second broad form the present invention provides a system for allowing a user to obtain a service, the service being implemented using components, each component corresponding to a respective service portion provided by a respective entity, the system including a processing system adapted to:
  a) Determine a combination of components in accordance with input commands received from the user, the defined component combination defining a sequence of service portions; and,
  b) Implement the components in accordance with the component combination, thereby causing the sequence of service portions to be performed, such that the desired service to be performed.

The system typically includes a base station coupled to one or more end stations via a communications network, the base station and end stations being adapted to cooperate to perform the method of the first broad form of the invention.

In a third broad form the present invention provides a computer program product for allowing a user to obtain a service, the service being implemented using components, each component corresponding to a respective service portion provided by a respective entity, the computer program product including computer executable code which when executed on a suitable processing system causes the processing system to perform the method of the first broad form of the invention.

In a fourth broad from the present invention provides a method of allowing users to manipulate data, the method including:

a) Providing details of a number of components, each component representing a respective service portion implemented by a respective entity;
b) Allowing users to define a component combination defining a sequence of service portions; and,
c) Causing the service portions to be defined in accordance with the defined combination.

The method typically includes:
a) For each component, receive a component specification from a respective entity; and,
b) Provide details of one or more components to the user in response to a request, thereby allowing the user to request implementation of the one or more components, the details being determined from the specification.

The method may include causing the processing system to:
a) Determine performance information, the performance information being representative of one or more criteria regarding the implementation of the components;
b) Provide the performance information to a user, the user selecting the components in accordance with the performance information.

The performance information generally includes at least one of:
a) An indication of the entity implementing the component;
b) An indication of the geographical location of the entity;
c) An indication of the duration for implementing the component;
d) An indication of a cost associated with implementing the respective component; and,
e) A rating, the rating being indicative of the success of the component.

The method typically includes:
a) Providing a number of different components for performing equivalent services, the different components being provided by different entities; and,
b) Inducing competition between the entities to thereby drive improvement of the components.

In a fifth broad form the present invention provides apparatus for allowing users to manipulate data, the apparatus including a processing system adapted to:
a) Provide access to one or more components, each component representing a respective service for manipulating data;
b) Allow user to define a combination of the components; and,
c) Cause the components to manipulate data in accordance with the defined combination.

In a sixth broad form the present invention provides a computer program product for providing a service embodied in a component, each component corresponding to a respective service for manipulating data, the computer program product including computer executable code which when executed on a suitable processing system causes the processing system to perform the method of the fourth broad form of the invention.

In a seventh broad form the present invention provides a method of providing a component embodying a service portion using a processing system, the method including:
a) Determining a service portion to be performed;
b) Determining a method of performing the service portion; and,
c) Generating a component specification defining the service portion, the component specification including a port specification indicating any information to be received by or output from the port.

The method typically includes further determining a private component specification defining the method of performing the service portion.

The method usually includes providing the component specification to a processing system, the processing system being adapted to provide details of the component to users thereby allowing users to select the component for use.

The method can include defining a component server to be implemented by the processing system, the component server being adapted to generate component instances performing the service portion.

In an eighth broad form the present invention provides apparatus for providing a component embodying a service portion using a processing system, apparatus including a processing system adapted to:
a) Determine in accordance with user input commands:
  i) A service portion to be performed;
  ii) A method of performing the service portion; and,
b) Generate a component specification defining the service portion, the component specification including at least one of
  i) Input specifications defining any data to be received; and,
  ii) Output specifications defining any data to be output.

In a ninth broad form of the invention the present invention provides a computer program product for providing a component embodying a service portion, the computer program product including computer executable code which when executed on a suitable processing system causes the processing system to perform the method of the seventh broad form of the invention.

In a tenth broad form the present invention provides a method of providing a service portion embodied in a component using a processing system, the method including causing the processing system to:
a) Receive a service request,
b) Generate a respective component instance in response to the received service request
c) Obtain any required information; and,
d) Perform the service portion.

The method typically includes causing the processing system to perform the service portion using at least one of
a) A predetermined process; and,
b) Input commands received from an operator.

In an eleventh broad form the present invention provides apparatus for method providing a service portion embodied in a component, the apparatus including a processing system adapted to:
a) Receive a service request;
b) Generate a respective component instance in response to the received service request;
c) Obtain any required information; and,
d) Perform the service portion.

In a thirteenth broad form the present invention provides a computer program product for providing a service portion embodied in a component, the computer program product including computer executable code which when executed on a suitable processing system causes the processing system to perform the method of the tenth broad form of the invention.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1:
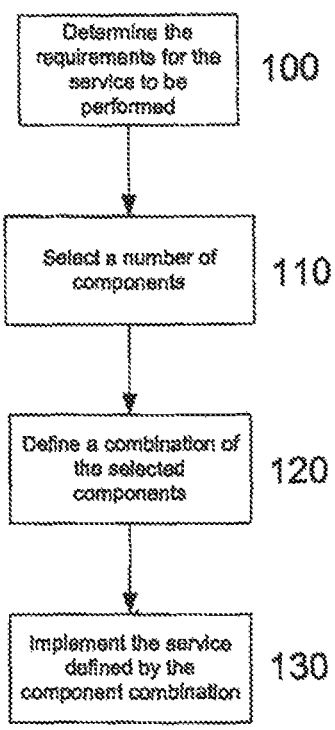
FIG. 1 is a flow diagram outlining an example of the provision of a service in accordance with the present invention.

An example of the method by which a service may be obtained will now be described.

In particular, the techniques utilise specific and ultimately highly specialised service portions that are embodied as components. In general each component is adapted to receive and output information via one or more respective ports. Combining these components in an appropriate fashion allows service portions to be combined to define the overall service to be performed.

As shown, the first step is to determine the requirements for the service to be performed at step 100. This is achieved by considering the service required and in particular, the tasks that need to be completed by the performance of the service. For example, this may be a single basic task such as the completion of a tax return, or alternatively, may be a more complex process involving the completion of a number of tasks, such as the provision of audit, tax and other accountancy services for a firm. Similarly, the service may be the drafting of a patent application, obtaining an International Patent Portfolio, or litigating a Patent. Examples will be described in more detail below but it will be appreciated that the techniques may be applied to any service industry.

Once the desired service has been determined, a number of components are selected that when combined in an appropriate manner will allow the service to be performed. In this regard, each component corresponds to a respective service or portion of a service (hereinafter referred to generally as a component service), which is used to perform all or part of the tasks required to provide the desired overall service.

In general, the component services will involve the manipulation of some form of data or other information, such as accounts or other financial information. Thus, for example, the component services can include processes such as the modification, creation or deletion of information, determination of data from information, or the like. This allows each component to contribute in some way to the performance of the overall service.

The component services may be performed automatically through the use of components formed from computer executable code, or the like. Typically however, the component services will be performed at least partially manually, or through combination of manual and automatic implementation.

The level of complexity of the component services will vary as will be explained in more detail below. Thus, for example, simple components may perform a single basic task, such as calculating a single value from received data, with this value being supplied to other components for subsequent processing. However, more complex components may operate to perform several tasks, such as calculating all or part of a tax return.

In order to achieve this, each component may be adapted to receive information, or other data, via one or more respective ports, and then perform manipulations of the information as required. Similarly, the majority of components will also include one or more ports for allowing manipulated information, data, or other information to be output. In general these ports are referred to as inputs or outputs for ease of description, although practically information transfer via an input or output may be bi-directional.

Thus, for example, the components may be adapted to receive details of accounts from a company, such as invoice information, thereby allowing the components to determine a tax return. In this case, if the company is an international company, then information will be transferred to a number of different components to allow separate tax returns to be determined for different jurisdictions. Furthermore, whilst the information may be initially transferred to a single component, the information may then be distributed to a number of different components to allow the tax return calculation to be performed as a number of specific tasks, with each component performing a specific task.

In use, the components interact with each other by transferring data or other information therebetween. Thus, for example, the output port of one component may be connected to the input port of another component, to allow two component services to be performed in sequence. Combining appropriate ones of the more basic level components in a hierarchical structure can also be used to allow more complicated services to be implemented as a collection of more basic component services.

Examples of components are set out in more detail below.

At step 120, a combination of the selected components is defined which will allow the desired service to be performed. In particular, this specifies how the components should be interconnected via the inputs and outputs, such that when the component services provided by the components are implemented at step 130, the interaction results in the performance of the desired service.

It will be appreciated that the process described above may be implemented using a number of different architectures. Thus, for example, the process may be implemented using a single processing system which has the ability to implement or at least co-ordinate the implementation of each of the components. However, typically the process is implemented using a distributed web based system, or the like, with user accessing facilities provided by a central base station via the Internet, or another communications network.

Figure 2:
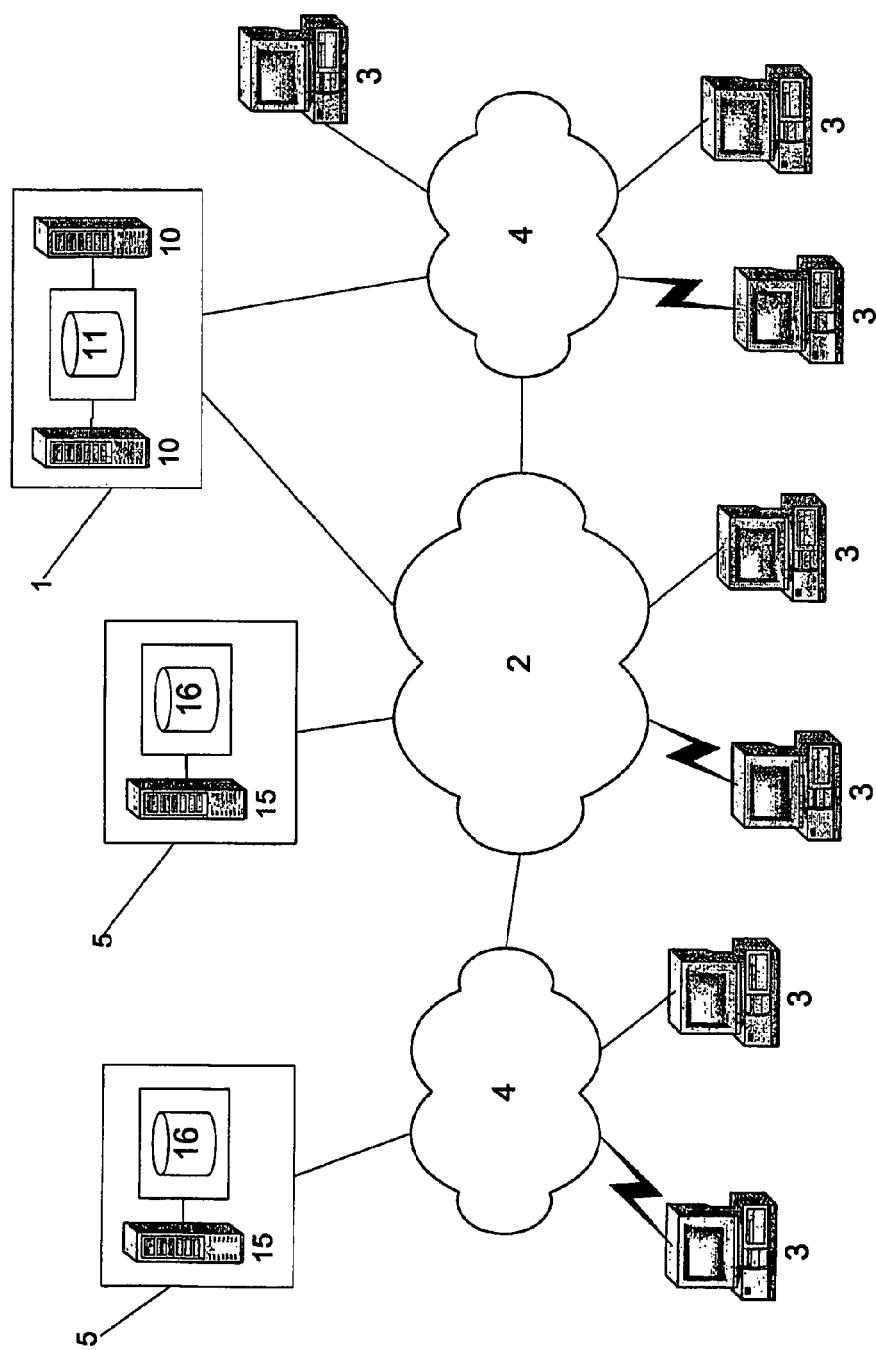
FIG. 2 is a schematic diagram of an example of a web based system for providing services.

An example of this will now be described in more detail with respect to FIG. 2.

In particular, in this example, the apparatus includes at least one base station 1 coupled via a communications network, such as the Internet 2, and/or a number of local area networks (LANs) 4, to a number of end stations 3.

In use, the base station 1 is adapted to allow users of the end stations 3 to select components from a database, define the component combination, and then implement the defined component combination in order to obtain the desired service. The selection of components will normally be achieved by selecting component representations as will be described in more detail below.

Accordingly, the base station 1 and the end stations 3 are adapted to communicate to allow details of the components to be transferred therebetween, allowing users to select components, and to determine component combinations defining the service required. This may be achieved in a number of manners, although the following examples will focus on the use of web pages.

In order to achieve this, the base station 1 typically includes one or more processing systems 10 (two shown in this example for clarity purposes only) coupled to one or more respective databases 11.

Figure 3:
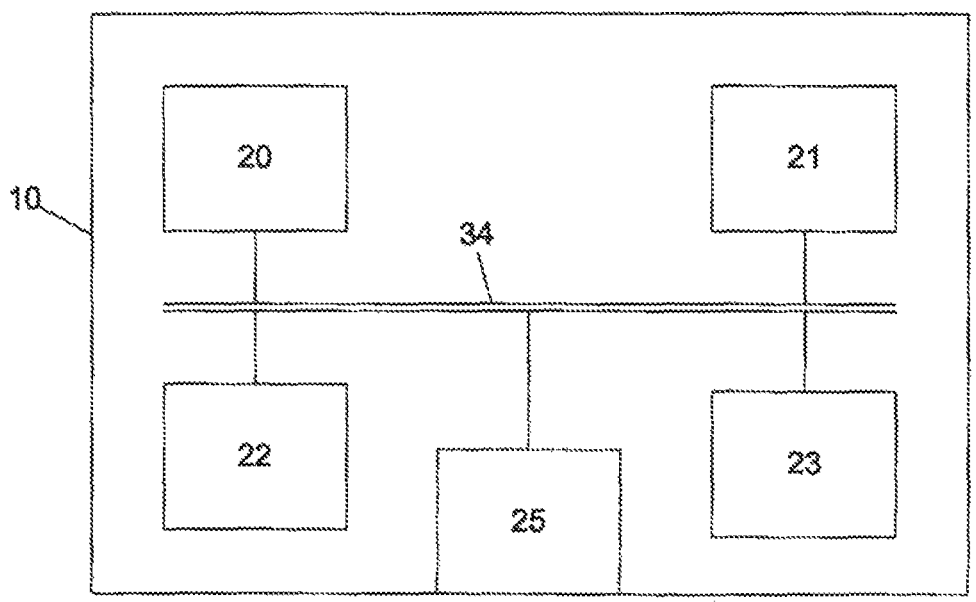
FIG. 3 is a schematic diagram of an example of a processing system of a base station of FIG. 2.

An example of a suitable processing system 10 is shown in FIG. 3. As shown, the processing system 10 generally includes at least a processor 20, a memory 21, an input device 22, such as a keyboard, or the like, an output device 23, such as a monitor, which are coupled together via a bus 24. The processing system is also provided with an external interface 25 for coupling the base station 1 to the Internet 2, or the LAN 4, as well as the database 16, as required.

The processing systems 10 are adapted to generate web pages for viewing using the end stations 3, as well as to implement component combinations defined by the end station user's. From this, it will be appreciated that the processing system 10 may be any form of processing system such as a computer, a laptop, server, specialised hardware, or the like.

Similarly, each end station 3 is adapted to communicate with the base station 1 to access web pages and transfer data to the base station 1, as required.

Figure 4:
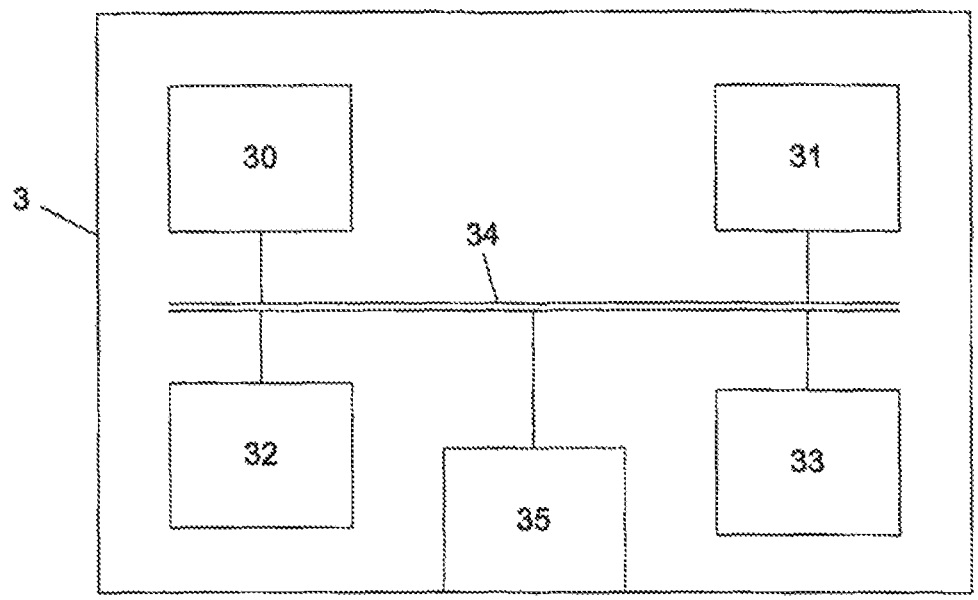
FIG. 4 is a schematic diagram of an example of an end station of FIG. 2.

An example of a suitable end station 3 is shown in FIG. 4. As shown the end station 3 includes a processor 30, a memory 31, an input device 32, such as a keyboard, or the like, an output device 33, such as a display, which are coupled together via a bus 34. The processing system is also provided with an external interface 35 for coupling the end station 3 to the Internet 2, or the LAN 4, as required.

In use, the processor 30 is adapted to communicate with the processing system 10 provided in the base station 1 via the communications networks 2, 4 to allow the processing system services to be accessed. Accordingly, it will be appreciated that the end stations 3 may be formed from any suitable processing system, such as a suitably programmed PC, Internet terminal, lap-top, hand-held PC, or the like, which is typically operating applications software to enable data transfer and in some cases web-browsing.

The components may be provided at, and implemented by, the processing system 10. However, typically the components are provided by one or more respective entities, each of which operates one or more respective entity stations 5, which are also coupled to the Internet 2, and/or the LANs 4, as shown. In this example, each entity station 5 is formed from an entity processing system 15, coupled to a store, such as a database 16, as shown.

Figure 5:
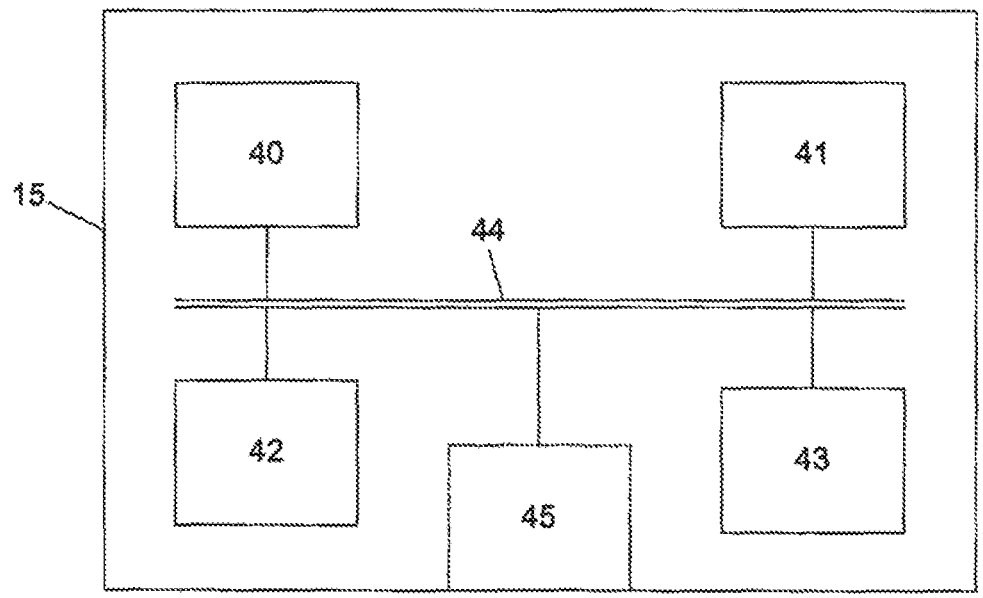
FIG. 5 is a schematic diagram of an example of an entity processing system of FIG. 2.

The entity processing system 15 must therefore be able to communicate with the processing system 10 via the communications networks 2, 4. In order to achieve this, the entity processing system 15 would generally be similar to the processing system shown in FIG. 5.

As shown in this example, the entity processing system 15 includes a processor 40, a memory 41, an input device 42, such as a keyboard, or the like, an output device 43, such as a monitor, which are coupled together via a bus 44. The processing system is also provided with an external interface 45 for coupling the entity station 5 to the Internet 2, or the LAN 4, as well as the database 16, as required.

In use, the processing system 15 is adapted to allow the entity to perform the services encapsulated in respective components. This may be achieved by having the service performed manually by an operator, in which case the entity station 5 acts as an interface between the operator and the remainder of the system. Alternatively, the service may be implemented automatically or through a combination of automatic and manual operation, in which case the processor 40 may perform some or all of the service. Accordingly, it will be appreciated that the entity stations 5 may be formed from any suitable processing system, such as a suitably programmed PC, Internet terminal, lap-top, hand-held PC, or the like. Typically however, as the services are data intensive, the entity processing systems 15 will be formed from servers, or the like.

To allow components to be implemented by the entity stations 5, whilst still allowing users of the end stations 3 to access the components via the base station 1, it is typical for details of the components to be stored in the database 11, in the form of component specifications. The component specifications may be in any one of a number of forms, and may include graphical representations, or the like. However, in general the component specifications include at least sufficient information for a user to determine the effect of the service embodied in the component. It will be appreciated that the manner in which the service is achieved will typically be retained as secret by the implementing entity and will not therefore be described in the specification.

Figure 6:
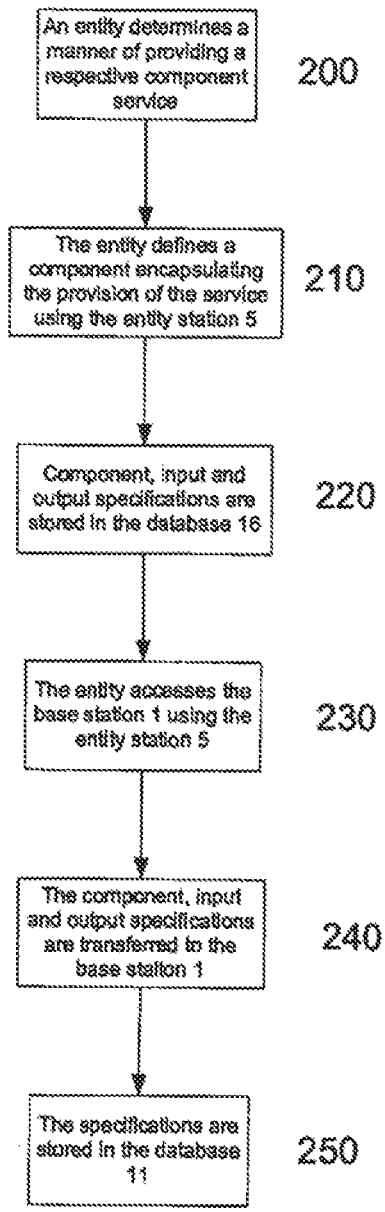
FIG. 6 is a flow diagram of an example of the method of having an entity provide a component to the base station of FIG. 2.

The manner in which an entity may provide details of a component in the form of component specifications will now be described with reference to FIG. 6.

In particular, at step 200 the entity determines a manner of providing a respective component service. This may be achieved in a number of ways and will depend on the respective component service and the manner in which the entity wishes to provide the component service.

Thus, for example, the entity may provide the component service manually by having an individual or team receive information via the entity station 5, modify or otherwise act upon the information, and then provide an output. The output may be provided to any one of a number of other entities, subsequent components, the processing system 10, the end station 3, or another one of the entity stations as will be described in more detail below with respect to step 420. Alternatively, the component service may be performed by computer executable code, executed by the entity processing system 15, in which case, the entity must first determine the necessary executable code. A combination of manual and automatic processes may also be used.

As a further option, the entity may provide a component service in the form of a compound component. In this case, the entity effectively defines a combination of previously existing components, which when combined in a predetermined manner or with skill and knowledge in a manual manner, or semi-automatic manner allows the required component service to be performed. In this case, the entity station 5 will be adapted to hand-off implementation of the components contained within the compound component to other entities, such as through other entity stations 5, and/or the base station 1, as required.

In any event at step 210 the entity defines a component encapsulating the provision of the component service using the entity station 5. In order to achieve this, the entity processing system 15 will generally be provided with applications software that aids the entity in this process. In particular, the software will prompt the entity to provide information that will be required by the processing system 10 to allow the functionality provided by the respective component to be determined by a user. Thus, for example the entity may be presented with a dialog box including fields defining the types of information that are required in order for users to determine the component service operation of the component.

In general, the required information includes at least component, input and output specifications. In particular, the component specifications are used to provide information regarding the effect of the service provided by the component, together with information regarding the component author, implementing entity, or the like. The component specification also includes sufficient information to allow the processing system 10 or the end station 3 to access the services represented by the component.

Accordingly, the component specifications typically include at least:

Manufacturer ID—used to identify the entity providing the service

Component ID—used to identify the respective component

Location information—used to identify where the component is implemented

Figure 7:
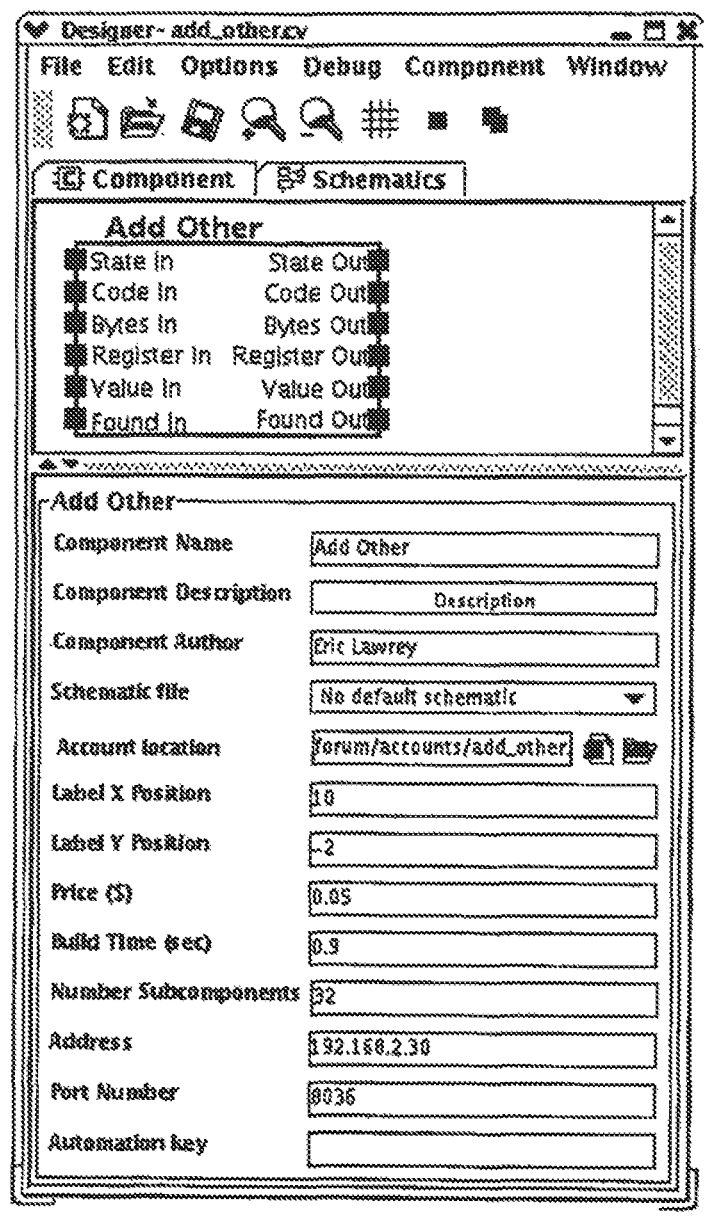
FIG. 7 is a schematic diagram of an example of a component properties dialog box.

Description—an indication of the effect of the service provided by the component This information may be provided for example through the use of a component properties dialogue box shown for example in FIG. 7. The properties dialogue box will prompt the entity to provide information such as the component name, the component description, the author, the address, report number or the like. In this example, the figure shows the graphical user interface (GUI) for a designer program which will be described in more detail below. In this case, the designer program has an "add other" component loaded for editing. The GUI has three major fields, namely:

1. Tool bar—which permits the editing of the component representation.
2. Component representation—What will be available at the forum once published
3. Component details—additional information that will be combined with the component representation that is required by the end user.

The applications software installed on the entity processing system 15 can also be used to generate any identifiers that may be required. In particular, it is generally necessary to generate identifiers to allow both the entity, and the component to be uniquely identified.

Furthermore, when implementing the component to provide the embodied service, an entity station 5 may be implementing the same component simultaneously for the purpose of providing a number of different overall services. Thus, for example, the entity may have to provide the same component service for a number of different users simultaneously. In this case, several different component instances are defined to exist on the entity station 5, with each component instance being applied to each respective service provision. Accordingly, in this case, it is also necessary to generate respective identifiers allowing each component instance to be uniquely identified.

The component specification may be provided in any form, although typically this is provided in the form of an XML file generated in accordance with a predetermined XML schema. This will typically be achieved by having software implemented by the end station 3 translate the information provided through the use of the dialogue box into an XML file.

In addition to this, the input and output specifications, are used to indicate any information required to allow communication between the components, and this will therefore typically depend on the nature of the respective component.

For example, the components may be adapted to handle a variety information at respective inputs. This may include for example, different data formats and/or different data types. In this case, the input and output specifications include details of the types and/or formats of data that can be received by the component inputs, or supplied by the component outputs. However, if components are only adapted to receive one form or type of data, this will not be required. Addressing information may also be provided to allow inputs and outputs to be connected. This allows components to communicate with each other, by transferring data from the output of one component to the input of a subsequent component.

In one example, control of this communication is achieved using agents, which are software applications executed at the location at which the respective component is implemented. The operation of the agents will depend on the implementation of the system, and in particular the nature of the components involved.

Thus, for components able to handle different types of data, the agents may be adapted to perform negotiation to select between available data types and formats specified in the input and output specifications, to allow respective components to communicate directly. Alternatively, the component may only be adapted to receive or output data in a single format. Accordingly, no such negotiation is required.

Agents are generally software constructs operated by the entity station to allow a component instance to communicate with other content instances. The input and output specifications may therefore also include details of the manner of operation of the respective agent.

It will be appreciated that in the situation in which the components are implemented substantially manually, the interaction between components may also occur manually. Thus, for example, individuals providing component services at two different entities may need to talk to each other to discuss a respective service implementation. In this case, the agents could be adapted to negotiate a meeting or conference time, as well as how this may be achieved (such as through the use of video or telephone conferences, or the like). It will therefore be appreciated that manual interaction with the agents may be required, and this can be achieved through the use of an appropriate interface generated by the agent on the entity processing system 15, such as through a chat room, or the like.

In general, the input and output specification may also include details of the manner of operation of the respective agent.

Figure 8:
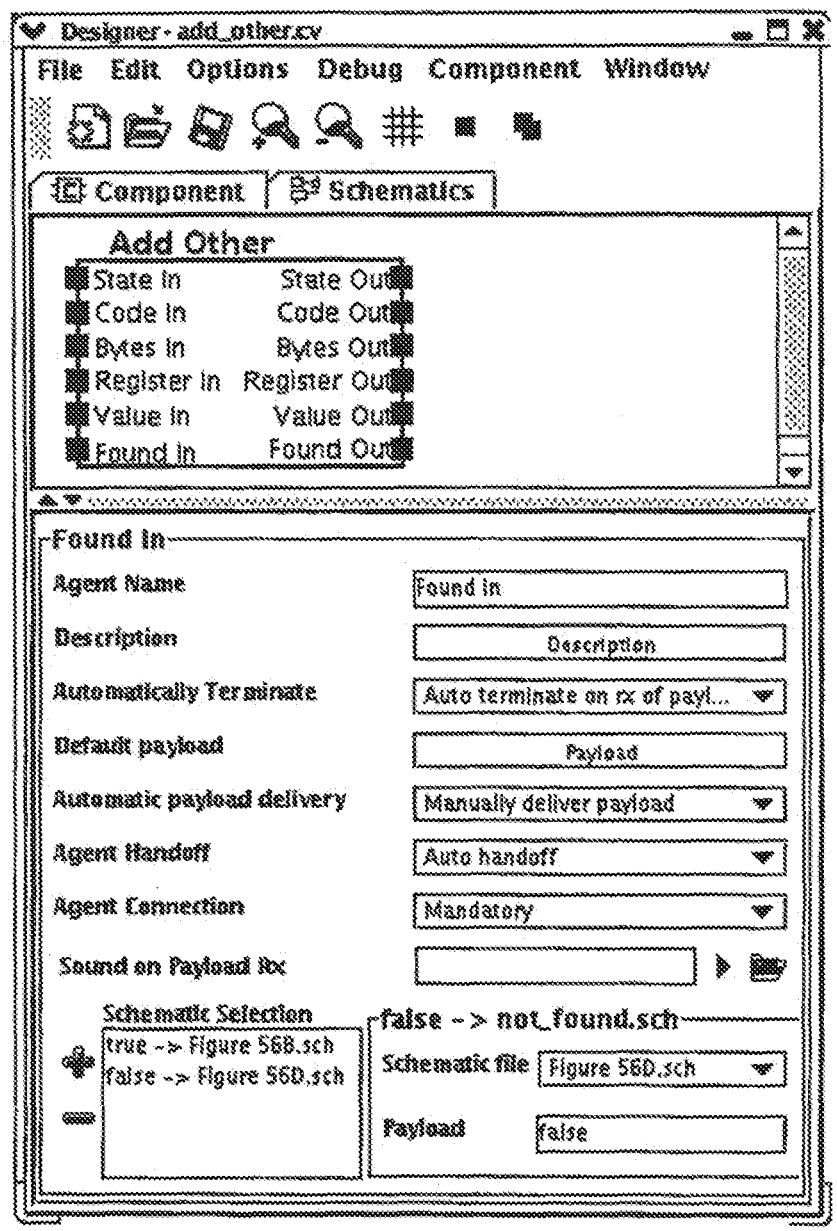
FIG. 8 is a schematic diagram of an example of an output properties dialog box.

In any case, details of the input and output specifications may be provided through the use of a dialog box that prompts the entity for details regarding the respective input and/or output and associated agent. An example of a dialog box for an output agent is shown in FIG. 8.

The operation of the agents will be described in more detail below. However, it will be appreciated that the entity also operates to construct agents when encapsulating the service as a component.

It is also possible for the negotiation to be performed using techniques other than agents, depending on the implementation of the invention.

Accordingly, at step 220 the entity processing system 15 operates to store the generated component, input and output specifications, in the database 16. The entity station 5 is then used to access the base station 1 at step 230, allowing details of the component, input and output specifications, to be transferred to the base station 1 at step 240, for storage in the database 11 at step 250.

It will be appreciated that if the component is self contained and automatically implemented, the entire component may be downloaded to the database 11, for storage thereon, in which case there is no requirement to store any information at the entity station 5. This allows the component service to be implemented by the processing system 10 automatically. Alternatively, the component may be transferred to the end station 3 for implementation thereon.

However, these techniques will generally result in the manner of implementation of the services to be made publicly available. The entity will usually wish to retain at least some form of control over the operation of the component for a number of reasons, in which case the component service may be implemented at the entity station 5. This is also generally required if the service implementation requires manual input from the entity, but may also be desirable for other reasons.

Thus, for example, this allows the entity to monitor use and operation of the component, as well as making it easier for the entity to adjust and/or modify the operation of the component to improve its efficiency. Furthermore, this allows the entity supplying the service to provide only an output, and not divulge the method used to implement the service. This allows the implementation of the service to be retained as a trade secret, specialised knowledge or the like.

In any event, as the system is adapted to handle a large number of components, it is generally undesirable to have all these located at the base station 1, as the database 11, and processing systems 10 would rapidly become over used.

Accordingly, the components are usually implemented at the entity stations 5, with details of the specifications being transferred to the base station 1, to allow users of the end stations 3 to select the components for use. In particular, when the users of the system select components in this fashion, it is transparent to the user whether the component itself is actually provided at the base station 1 or whether the component is provided at an entity station 5. This is because all the specifications needed to access the entity station 5 providing the respective service are stored in the base station 1.

In the event that the service embodied by the component is implemented at the entity station 5, then it is typical to further generate a private component specification, which sets out details of the manner of implementation of the respective service. This may include executable code and/or instructions used by the entity when performing the service. Alternatively, if the entity implement the data manipulation solely by using other components, the private specification may be in the form of a component schematic, which is constructed and implemented in accordance with the techniques described herein. It will be appreciated from this that entities can define service implementations by contracting out data manipulation services to other entities in a specific combination.

In any event, if a private specification is created this is stored at the entity station 5 at step 260.

Private specification should be contrasted with the component specification described above which only describes the service provided, and not the manner of implementation. The private specifications are never made available to individuals outside the entity, thereby allowing the entity to retain the method by which the respective service is implemented as secret. This therefore helps the entity retain protection for their method, as will be appreciated by persons skilled in the art. In any event, by only providing a definition of the implemented service in the component specification, it will be appreciated that there is no danger in making the component specification available to the public, by having the component specification stored on the base station 1.

A detailed example of the manner in which a user uses the base station 1 to obtain a service will now be described in more detail, with respect to the flow chart set out in FIGS. 9A to 9E.

Figure 9A:
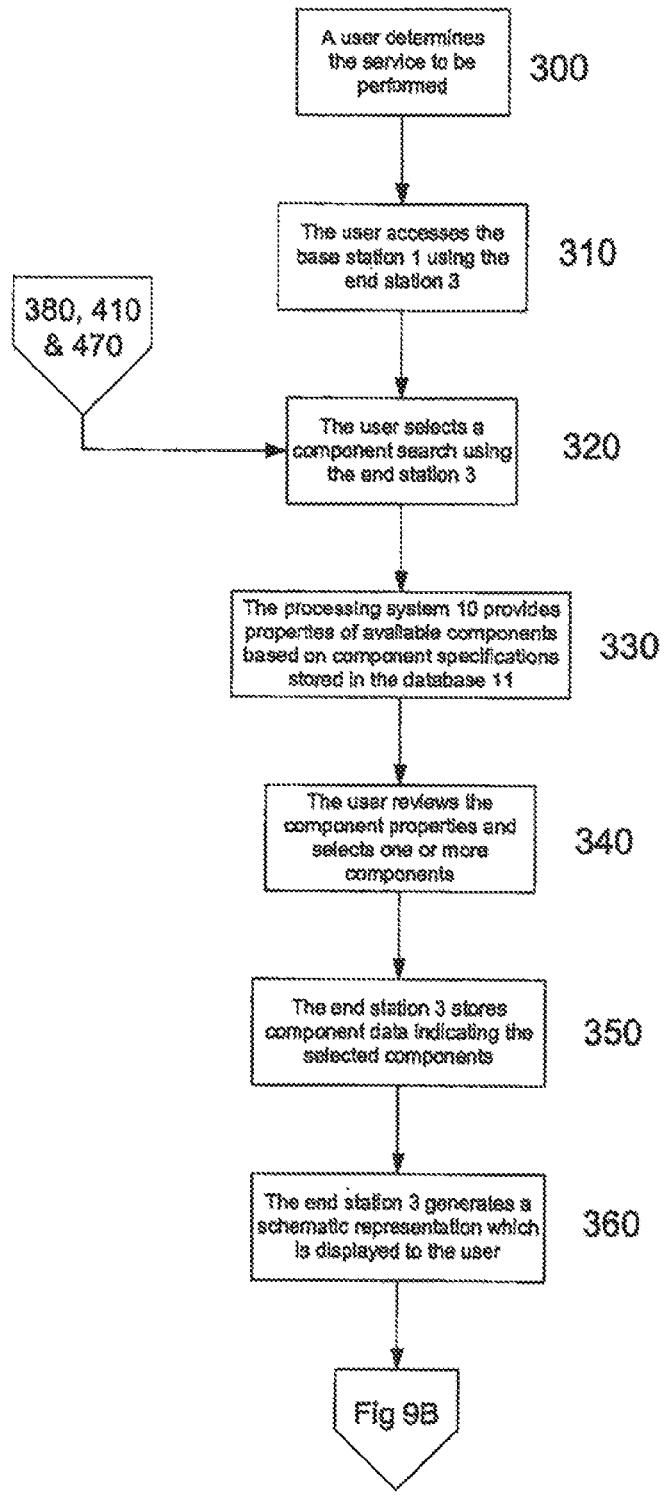
FIGS. 9A to 9E are a flow diagram of an example of the method of performing a service using the system of FIG. 2.
Figure 9B:
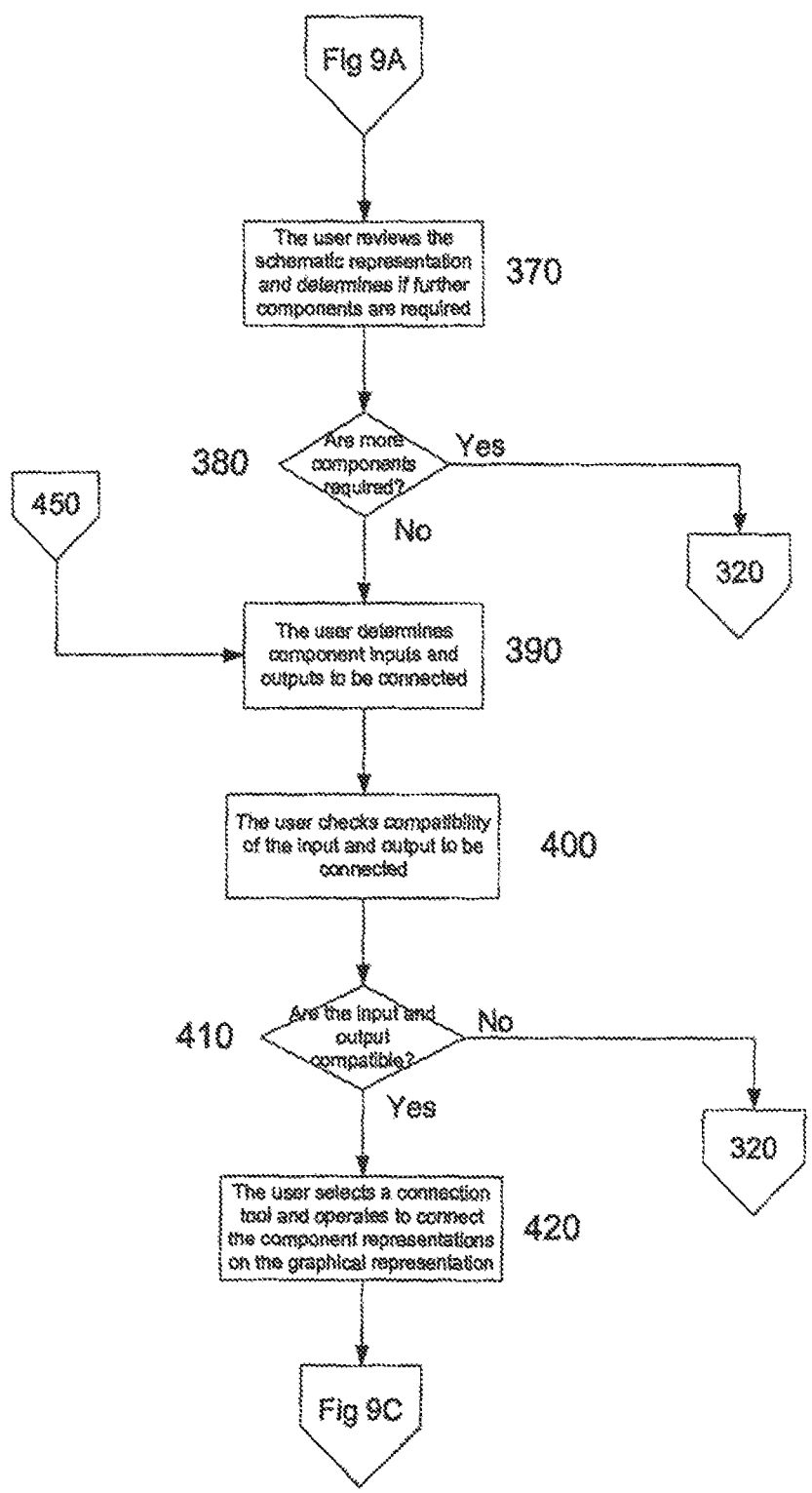
Figure 9C:
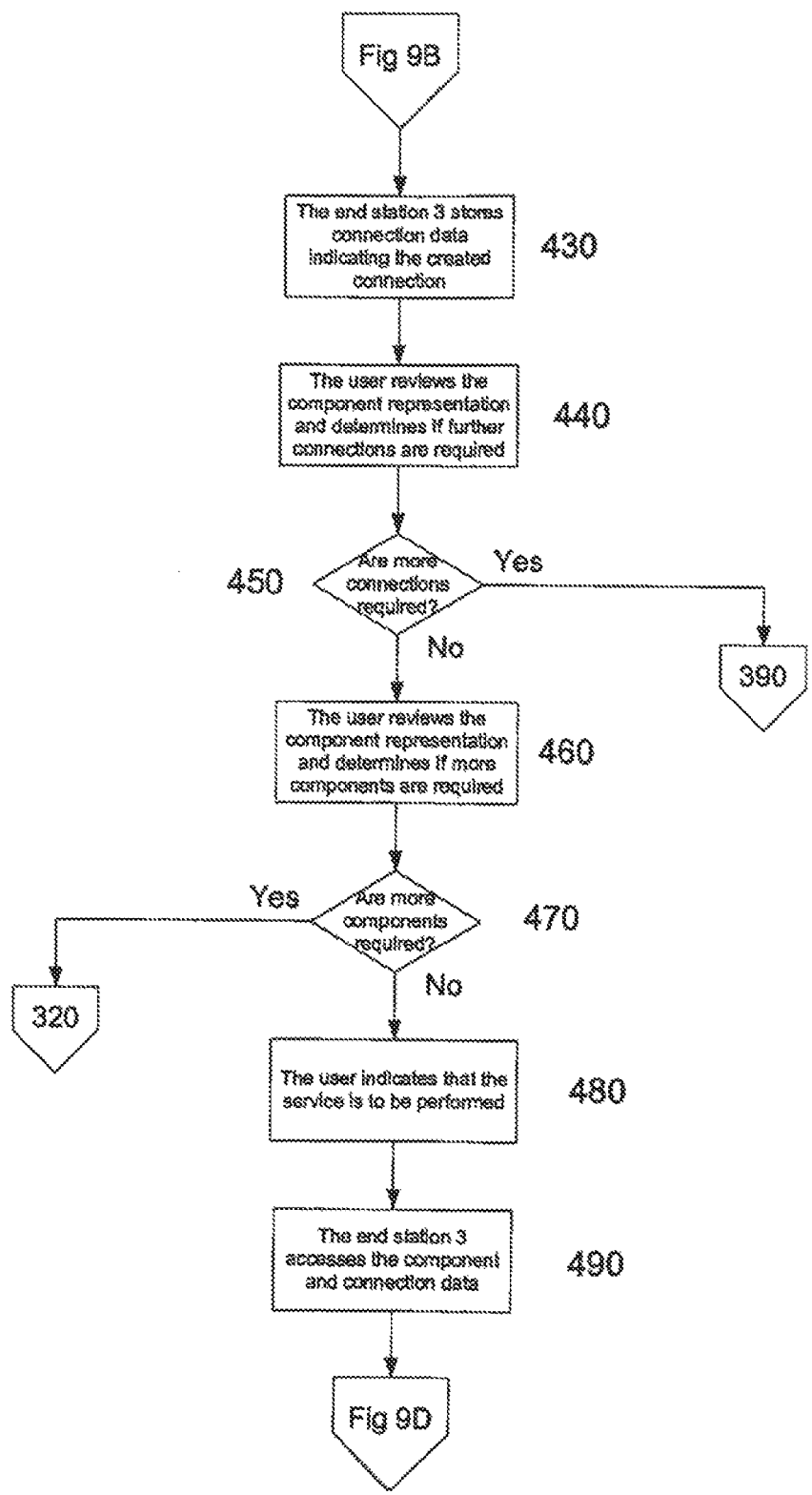
Figure 9D:
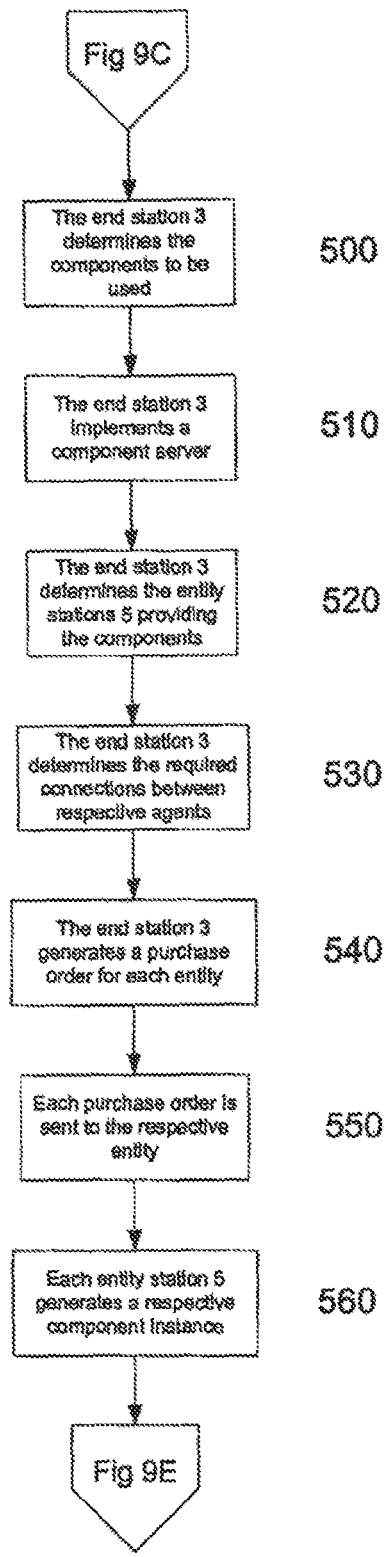
Figure 9E:
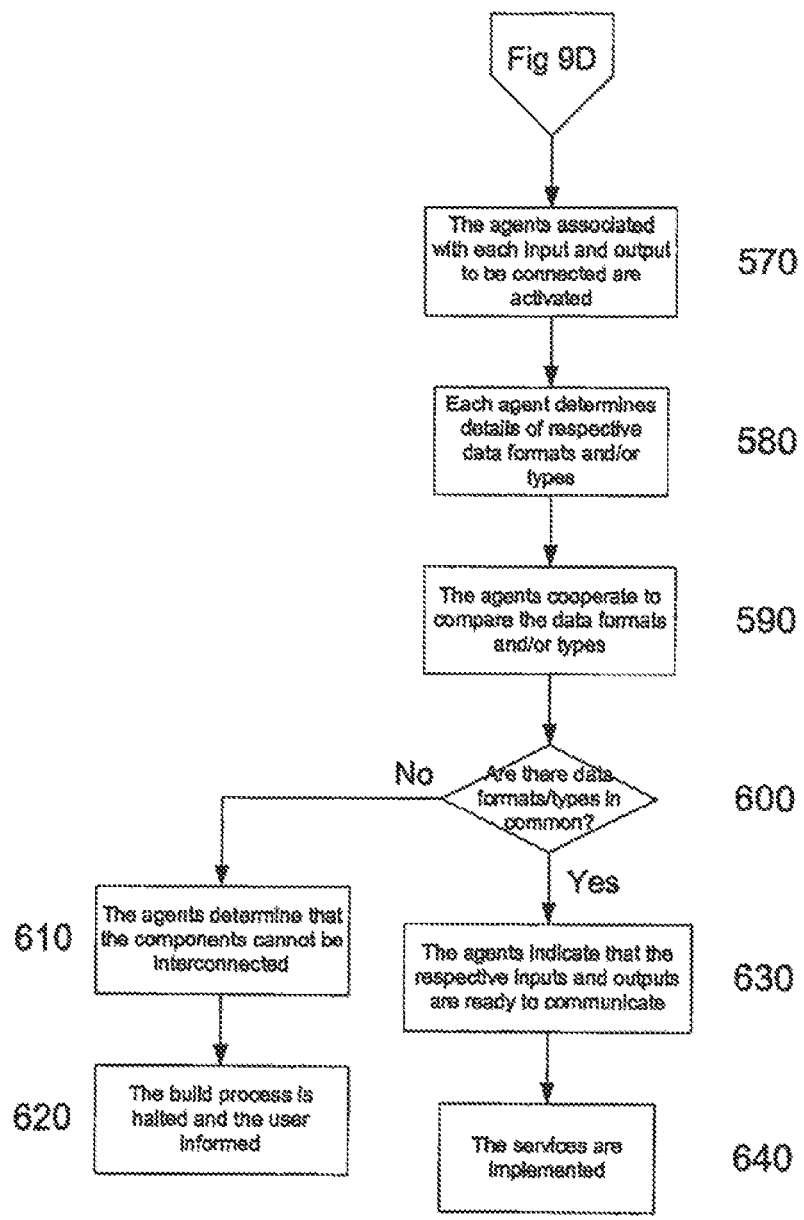

Accordingly, as shown at step 300 in FIG. 9A the first stage is for a user to determine the requirements of the service to be performed. At step 310 the user then accesses the base station 1 using the end station 3.

At step 320 the user selects a component search using the end station 3 and this causes the processing system 10 to provide details of available components based on component specifications stored in the database 11, at step 330. In particular, the processing system will typically allow users to search through categories of components, with the categories defining different forms of functionality. This allows users to rapidly locate components that are suitable for performing required services.

In general, different categories of component will be defined for different industries and for different groups of services within an industry. This would usually be broken down in a hierarchical fashion. Thus for example a category may be provided for accounts services, with separate subcategories for audits, tax assessments, etc.

At step 340 the user reviews the component properties and selects one or more components. This may be achieved in a number of ways, although typically the user will be presented with navigable lists that provide at least a component title and brief additional description of suitable components and the component services provided therein. The user can then select a respective one of the components allowing further details to be provided, and ultimately, the selection to be made. This may be based on criteria such as cost, quality of service previous implementation details or the like, as described in more detail below.

Thus, for example, the user may wish to have a patent application filed, which will require at least the patent specification to be drafted and filed. In this case, a single entity may provide a respective component for providing both services. Alternatively, these separate stages may be provided by respective entities as separate components. Thus, in this case, the user can select a drafting component corresponding to the provision of drafting services, and a filing component corresponding to the provision of filing services.

In this case, the drafting component will require details of the invention as an input, and will provide the drafted specification as the output. The filing component will require a drafted specification as an input and will provide patent application details as an output. This will be described in more detail below.

The details of the component may be provided for example through the use of the properties dialogue box similar to that shown for example in FIG. 7. In this case, the details include information such as the component name, the component description, the author, the address, report number, or the like, and will be determined directly from the component specifications stored in the database 11.

At step 350 an indication of the selected components is stored. This may be achieved in a number of manners depending on the implementation. Thus, for example, the end station 3 typically generates component data, which is stored in the memory 31, the component data including an indication of each component selected by the user. Alternatively, however, the processing system 10 may generate the component data and store it in the database 11.

At step 360 the end station 3 (or alternatively the processing system 10) generates a schematic representation, including representations of the components so far selected. The schematic representation is used to allow the user to define the component interconnections, as will be described in more detail below. In particular, this allows the user of the end station 3 to visualise the components and how these will need to interact with each other to perform the required service.

The schematic representation includes a representation of each of the components selected. The component representation is generally defined by the entity and transferred to the base station 1 as part of the component specifications, although any suitable technique for generating the representation may be used. When the user selects a respective component, the corresponding component representation is transferred from the base station 1 to the end station 3, and added to the schematic representation, as required.

It will therefore be appreciated that the indication of the component stored by the end station 3 may be in the form of the component representations. Furthermore, selection of components may be achieved by simply dragging component representations, and dropping these into the schematic representation.

Figure 10:
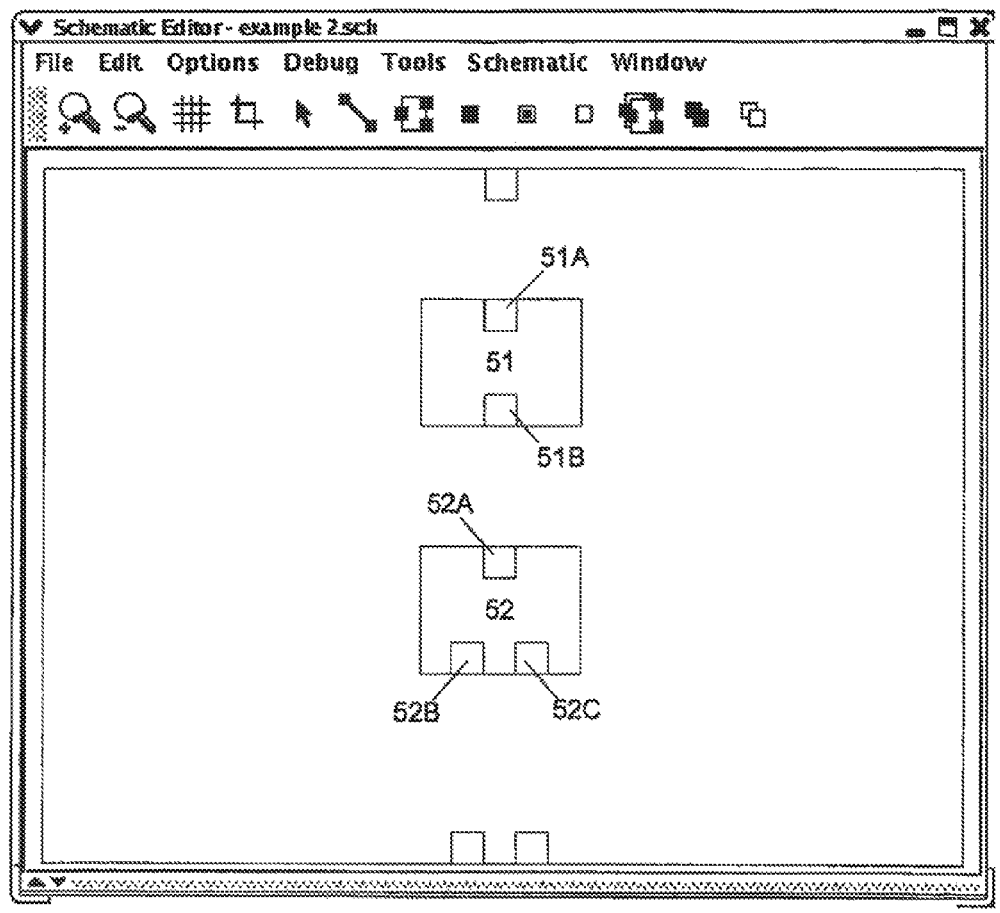
FIG. 10 is an example of a schematic representation that is presented to the user.

An example of a schematic representation is shown in FIG. 10. As shown, the schematic representation is displayed in a schematic window 50, and in this example, includes two component representations 51, 52. Each of the components has a number of inputs and outputs, shown generally at 51A, 51B, 52A, 52B, 52C.

In the example of filing a patent application, the component 51 can correspond to a drafting component, with the component 52 corresponding to a filing component. In this example, the drafting component 51 is adapted to receive details of the invention at the input 51A, and provide a drafted specification at the output 51B. The filing component obtains the patent specification and provides details of the filed application and the associated patent specification at the outputs 52B, 52C.

Figure 11:
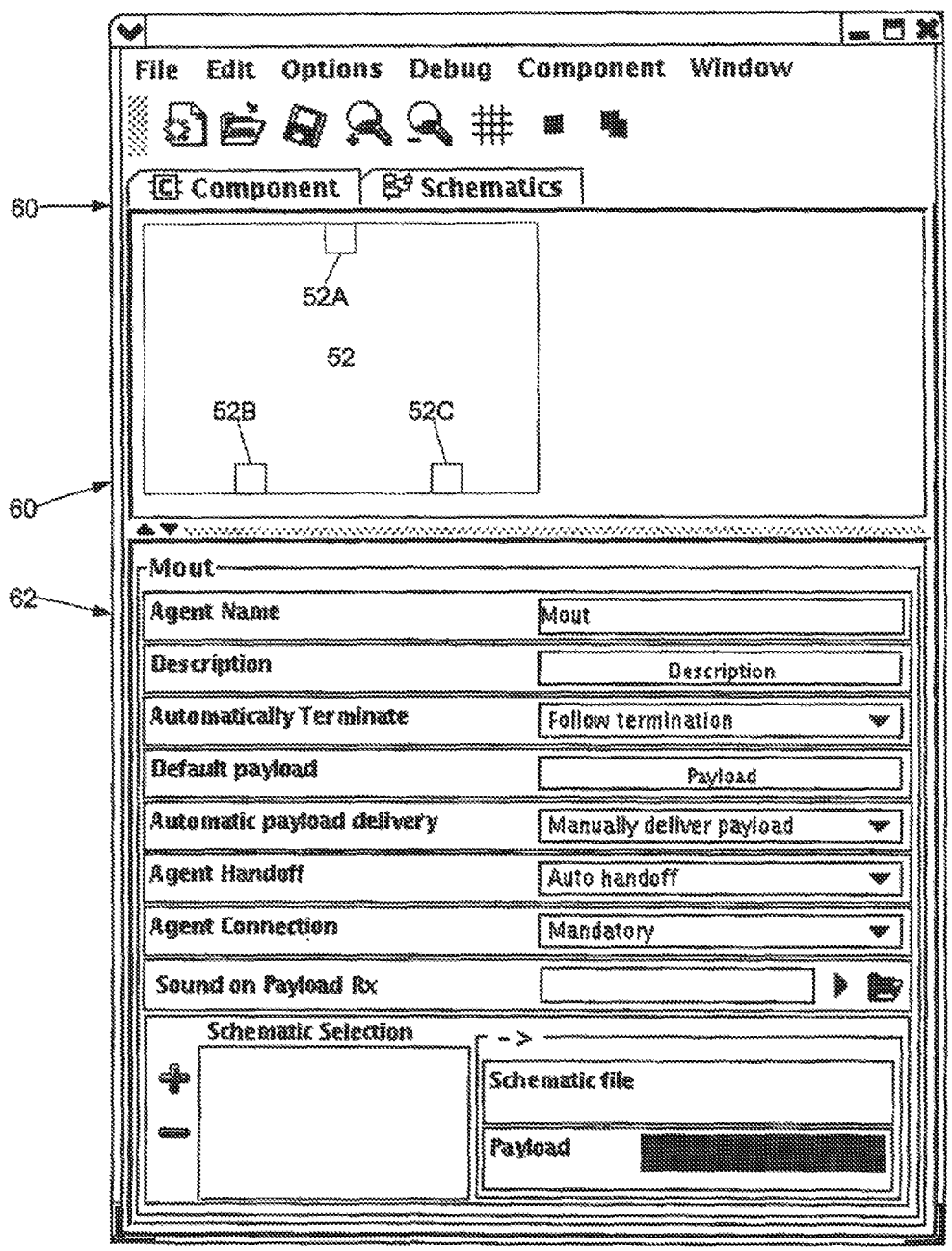
FIG. 11 is an example of a component representation that is presented to the user.

If the user selects one of the respective components shown in the schematic representation, the user is presented with a single component representation, an example of which is shown in FIG. 11. In particular, FIG. 11 shows a component display screen 60 including a representation of the component having the input and output representations 52A, 52B, 52C presented thereon.

The component display screen also includes a number of window selection tabs 61, which allow the user to navigate between the component window 60 shown, the schematic window 50 mentioned above, and an auto select window.

An agent window 62 is also provided, which displays details of a selected input or output agent (in this example agent 52C), obtained from the respective input and/or output specification.

In use, the user can navigate around the component and schematic representations to allow various information regarding the components to be provided. Thus, for example, by selecting the component representation 52, this can allow the properties of the corresponding component to be displayed, as shown for example in FIG. 7. Similarly, by selecting a respective one of the input and/or output representations, details of the respective input or output will be displayed in the agent window 62. These details will typically be provided by displaying an input or output dialog box, similar to the one shown in FIG. 8, as appropriate.

The information viewable by the user is typically limited to the external schematic, which as the external representation of the service embodied by the component, and therefore corresponds to the component specification. The graphical user interface shown in FIG. 11 may also be used by the entity in defining the component representation as described above.

In any event, the user reviews the presented schematic representation and determines if further components are required at step 370. If it is determined that more components are required at step 380, the process returns to step 320 to allow the user to return to the component search tool and select more components using the end station 3. Representations of these components can then be added to the schematic representation as required, for example using drag and drop techniques.

Once the required components (or at least some of the required components) are selected, through the placement of corresponding component representations on the schematic representation, the user determines component inputs and outputs that are to be connected at step 390.

In order to ensure that the components may interact successfully, the user will typically check at this point whether the input and output that are to be connected are compatible at step 400. In particular, the user checks whether the input and output can handle any common data types and/or formats. This information can be determined by examination of the input and output details determined from the input and output specifications. Alternatively, the component may be adapted to provide the drafted specification as a Word™ document, in which case the subsequent component must also be adapted to receive Word documents.

Thus, for example, in the case of filing a patent application, the drafting component may provide copies of the drafted specification in a first language, whereas the filing component may require the specification in a second language. In this case it will be appreciated that the components cannot be directly interconnected, as the entity providing the filing services will be unable to provide the filing services with the specification in the first language.

If the user determines that the input and output cannot be connected at step 410, the process returns to step 320 to allow one or more alternative components to be selected.

Figure 12:
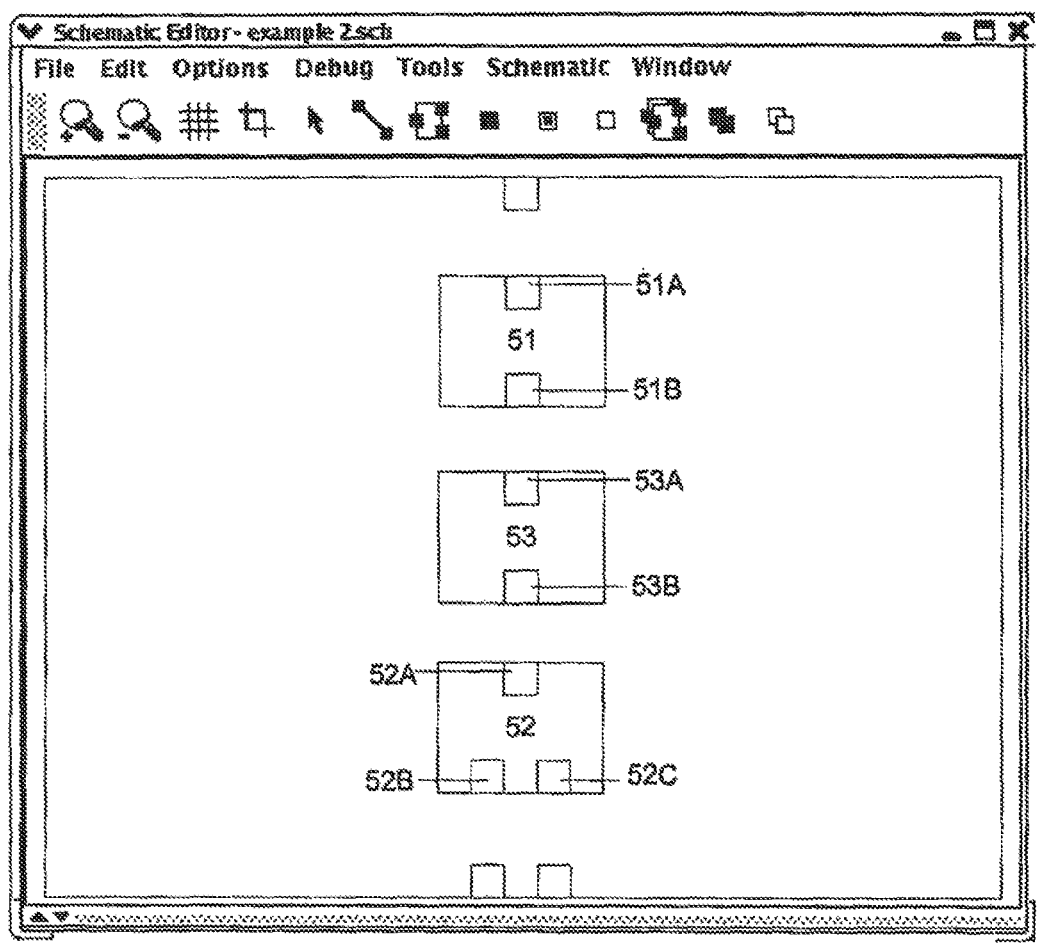
FIG. 12 is an example of the schematic representation of FIG. 11 modified to include an additional component.

In this case, the user can select an alternative drafting or filing component. Alternatively, the base station 1 may include a component 53 that translates received documents from the first language to the second language, or from a Word document format to another format in which case, this component can be used to interconnect the output of the drafting component 51 and the input of the filing component 52. This is shown by the component 53 in FIG. 12.

Otherwise, the user selects a connection tool and operates to generate a connection representation between the input and output of the respective component representations on the schematic representation, at step 420. The end station 3 interprets the connection representation as a connection between the respective input and output, and generates connection data representing the connection.

Figure 13:
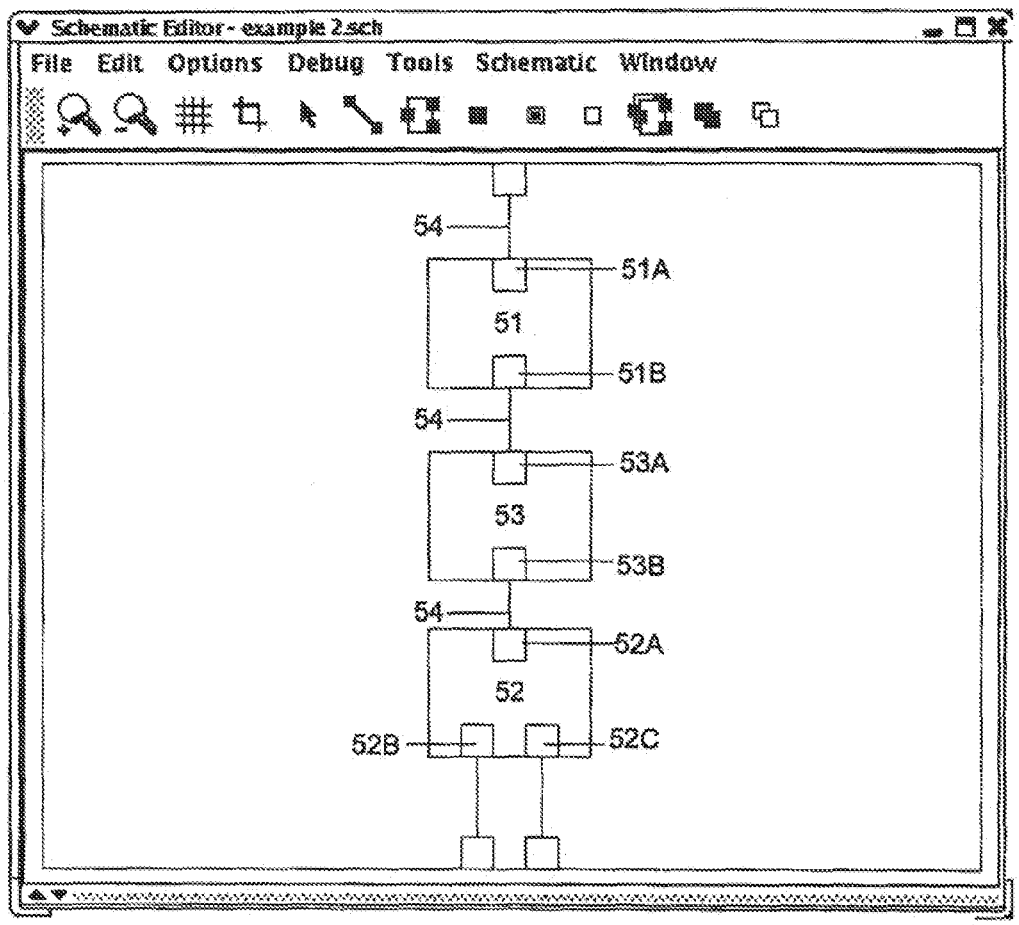
FIG. 13 is an example of the schematic representation of FIG. 12 modified to include interconnections.

An example of this is shown in FIG. 13. In particular, FIG. 13 shows the schematic representation of the component representations 51, 52, 53 of the component representations shown in FIG. 12, with the components being interconnected using the connection representations shown generally at 54.

Figure 14:
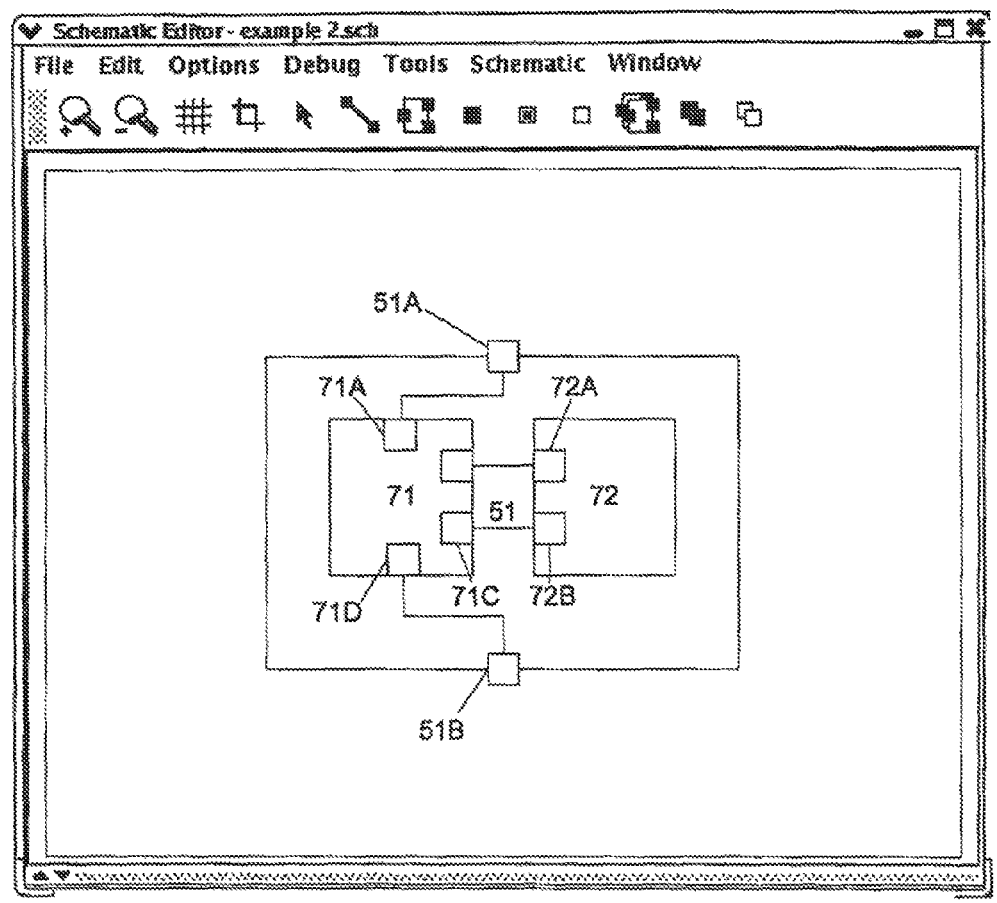
FIG. 14 is an example of a schematic representation of the internal structure of the component of FIG. 12.

FIG. 14 shows that the component representation 51 corresponds to a compound component formed from a number of sub-components. These sub-components are in turn represented as a specification component 71, and a drawing component 72. These components are adapted to allow the text and the drawings to be created separately. The specification component 71 includes two inputs 71A, 71B and two outputs 71C, 71D. The drawing component 72 includes an input 72A, and an output 72B. This is shown for the purpose of explanation only as generally the manner in which the component 51 is implemented will be retained as secret by entity and this information would not be available to the end user.

In use, the specification component 71 receives details of the invention at the input 71A, and outputs the specification at the output 71D. Similarly, the drawing component 72 receives details of the specification and/or draft drawings at the input 72A, and outputs the drawings at the output 72B.

The function of the components represented by the schematic shown in FIG. 14 is not important for the purposes of this example, and is used only to demonstrate the operation of the schematic representation.

In any event, the user can select a respective input and output on the schematic representation, and then draw on a connection representation between the inputs and outputs at step 420 thereby defining a connection between the respective input and output.

In this example, neither the end station 3 or the processing system 10 operates to examine the validity of the connections, and in particular it is not determined whether data can successfully be transferred from the output of the first component, to the input of the second component. However, it will be appreciated that checking by any of the processing system may be performed in some implementations.

In any event, in this example, the end station stores an indication of the created connection in the form of connection data at step 430.

The user then reviews the schematic representation and determines if further connections are required at step 440. If it is determined that further connections are required at step 450, the process returns to step 390 to allow further connections to be defined in the manner described above.

Thus effectively, the user will use the drawing tool to define all the connections required in the schematic representation. This will typically require that each input and output of each component is coupled either to another output or input. This will typically require that each input and output of each component is coupled either to another output or input, although appropriate termination may be provided in some cases.

If it is determined that no further connections are required for the components in the schematic representation at step 450, the user reviews the schematic representation and determines if more components are required at step 460. This allows the method to return to step 320 so that more components may be included, if it is determined that more components are required at step 470.

Thus, the user can effectively select two or more components and operate to interconnect these, before going back to select further components.

If it is determined that no further components are required at step 470, the user indicates that the service is to be performed at step 480.

It will be appreciated that the use of the graphical based system described above is for the purpose of example only, and that alternative techniques may be used to define component combinations. For example, components could be represented with a suitable text based language, where functions could represent components, statements could represent component combinations, and variables could represent agents.

At this point, the user may optionally review the schematic representation and determine if the service is to be performed. In particular, the user will generally be presented with information regarding the overall service provision, such as an indication of the overall cost, time, resource usage, resultant performance, or the like.

This is typically generated by having the end station 3 and the processing system 10, cooperate to determine the relevant information. Thus for example, the end station 3 may transfer an indication of the schematic to the processing system to allow the relevant values to be determined, or the information may be included as part of the component specification. If the schematic build process is hosted by processing 10, then the information can be determined and simply displayed to the user on the end station.

In any event, this allows the user to assess whether they are satisfied with the service defined by the respective schematic representation, and therefore whether they wish to proceed.

The implementation of the services defined in the schematic representation is achieved through the use of agents, which operate to allow the components to interact, as will now be explained in more detail.

The manner in which this is achieved will depend on the respective implementation. In one example, the agents are adapted to do no more that receive data or other information from another component. In this case, a single transfer of data occurs between the agents on the respective components, and this form of communication may therefore be considered a single event transaction. However, in the event that components are adapted to handle different data formats, negotiation is required to determine common data formats. This will require transfer of a number of messages between the agents known as multiple event transactions. For the purpose of this example, multiple stage transactions will be described, although it will be appreciated that the general techniques equally apply to single stage transactions.

It will also be appreciated that managing the construction may alternatively, or additionally be performed by the processing system 10, one or more of the entity stations 5, other processing systems, or a combination of the above depending on the respective implementation. However, the remainder of this example will be described with reference to the management process being performed by the end station 3.

In particular, upon receiving instructions to provide the component services at step 480, the end station 3 accesses the component and connection data at step 490. At step 500, the end station uses the component data to determine the components to be used in performing the service.

At step 510, the end station 3 implements a component server which is a software entity executed by the end station 3, to allow the end station to implement a component instance. In this case, the component server is at the highest level in the hierarchy, and is therefore used to implement a root component containing all other components in the schematic. As a result, the component server is known as the root server.

At step 520, the end station 3 uses the schematic and the component specifications to determine those entity stations 5 that are supplying the respective components. At step 530, this information, together with the connection data from the schematic is used to determine details of the required connections between the agents of respective components.

At step 540 the end station 3 generates a purchase order corresponding to each component to be used. In particular, the purchase order is adapted to be sent to the entity providing the respective service, via a respective entity station 5, to request the provision of the respective component services. In general each purchase order will include at least the following information:
Manufacturer ID
Component ID
Service ID—used to identify the respective component service instance as there may be more than one component on the respective schematic.
Agent connection details—to allow the agents of the component to be connected.

It will be appreciated that whilst the above describes the use of purchase orders, these are not essential, and alternative techniques for ordering the implementation of component may be used.

At step 550 each purchase order is sent to the respective entity. In one example, this allows each entity to determine if it is capable of performing the respective service. Thus for example, an entity may become unavailable due to implementation problems such as faults with the computer executable code or unavailability of an individual performing the service manually, or the like.

In the event that a component is formed from a number of sub-components, the inability of an entity to implement the component may arise from the failure of one or more of the sub-components, which in turn may be the responsibility of other entities. This will be determined by the entity station 5 based on responses from entity stations 5 implementing the sub-components and will be indicated to the end station 3.

If an entity cannot perform a service, whether this is due to a problem with the respective component itself, or any associated sub-components, an indication of this can be transferred to the end station 3. If the end station 3 determines not all components can be performed, then the process can either end, or allow the user to update the schematic representation by selecting one or more alternative components. Thus, for example, the process can return to step 320, to allow different components to be selected.

Assuming the service can be performed, or if no such assessment is made, the entity station 5 generates a component server at step 560 to allow the respective component instance to be performed.

In this regard, the component server implemented by the entity station 5, may need to generate respective purchase orders which are sent to any entity stations providing sub-components used in the implementation of the component. It will therefore be appreciated that the entity station 5 implementing the component can act in a manner similar to the end station 3 by sending out respective purchase orders to entity stations 5 implementing the sub-components. Thus the entity station 5 uses the component specification to determine the sub-components and so on, in a manner similar to steps 500 to 540 performed by the end station 3. This highlights the hierarchical nature of the process.

Alternatively, the data manipulation service may be implemented by executable code, in which case this will be implemented by the component server as a component instance, as will be appreciated by persons skilled in the art. Other options are also available as will be appreciated by persons skilled in the art.

At step 570 the agents associated with each input and each output to be connected are activated. In general, the agents are software entities implemented by the component server implementing the respective component instance. Accordingly, the agents will be activated as soon as the respective entity station 5 has received the purchase order, and has generated the respective component instance. Thus, activation of the required component instances and associated agents will occur in sequence throughout the schematic as the required purchase orders are propagated to the required entity stations 5.

In particular, the agents are activated in a predetermined sequence as will be described in more detail below. In a multiple event transaction environment, as an agent is activated, the agent determines details of the respective data formats and/or types from the respective input/output specification at step 580. At step 590 the agents then compare the determined data formats/types, by establishing a connection in accordance with the connection information provided to the respective component server in the purchase order. In particular, the agents of the respective input and output to be connected transfer messages via the communications networks 2,4 as required, based on the addressing information in the purchase orders.

In any event, to achieve the negotiation, the messages include indications of the respective data formats/types to determine if there are any data formats/types in common. In this regard, it will be appreciated an input and output can only successfully communicate if both the input and output are able to handle a common data format and/or type.

Whilst this may be performed automatically by forming the agents from executable code able to determine the common formats, negotiation may alternatively be performed manually, for example, if the service embodied by the components are manually implemented. In this case, the agent will launch a dialogue box allow operators at different entity stations to communicate and negotiate. This will typically be implemented in a manner to a chat session between the two operators.

Thus, in the example outlined above, the agent associated with the output of the drafting component will communicate with the input of the filing component to determine if the format of the provided patent specification will be acceptable.

If it is determined that there are no data formats/types in common at step 600 the process proceeds to step 610 at which points the agents determine that the components can not be interconnected. This will occur for example if one of the components is outputting data in a first format (such as the first language) whilst the other component needs to accept the data a second format (such as the second language). If this occurs, the service implementation process is halted and the user requesting the performance of the service is informed at step 620.

This allows the user to take corrective measures to allow the build process to continue. This may be achieved, for example by adding in additional components or agents, or my manual manipulation of the data, to allow the error to be corrected (for example to allow the specification to be translated). In this regard, if the agents are provided on sub-components of a component implemented by one of the entity processing system, it may be the responsibility of the entity implementing the respective component to ensure that the sub-components establish communication.

Alternatively, the process can be terminated such that the service is not provided.

In any event, if the respective input and output have data formats/types in common, then at step 630 the agents determine if the respective inputs and outputs are ready to communicate, in which case implementation of the service will occur at step 650.

It will be appreciated from this that in the case of a single transaction event connection being established between agents, this will general involve, simply activating an input agent to receive a message containing data from any another agent. Similarly, in the case of an output agent, the agent will be activated, and will take no action until output data is provided by the component, at which point it will generate an message including the output data and transfer this to another agent. In this case, the steps 580 to 630 are not required.

In any event, the components will provide the respective component services defined therein by having the entity stations 5 interact with data or other information. The data or other information received in messages from other agents by agents at the inputs may be manipulated or otherwise used, with the results of the service being transferred to the end station 3, or another one of the entity stations 5, as required by the defined schematic representation.

Thus, when a respective component instance receives the data to be manipulated, the component server hosted by the respective entity station 5 will interact with the data, modifying the data as required before providing the modified data at one or more of the output ports. Thus, the data may be manipulated by the executable code implemented by the respective component server, or manually, in accordance with input commands from an operator. In this latter case, it will typical for an agent receiving data to present this to the user via a suitable interface, and then allow the operator to modify the data before transferring it to an output agent.

Accordingly, from this it will be appreciated that the agent may serve no more purpose than to provide an interface to allow an operator to interact with data and other components.

In the above example, details of the invention will be transferred to a respective entity station 5 implementing the drafting component 51, allowing the respective entity (which will typically be a suitably qualified patent attorney) to perform the drafting of the specification. This may involve the use of a separate draftsperson in the formation of the drawings as represented by the sub specification and drawing components 71, 72.

In general, each component will be implemented at the respective entity station 5. In order to achieve this the information used in providing the service will be downloaded from the end station 3, the base station 1, or another one of the entity stations 5, to the respective entity station 5. This will be achieved by transferring the data to a specific port or the like on the processing system 15, as indicated in the component specification. The information will be transferred in accordance with the component instance ID to ensure that the correct component instance is used to manipulate the data. It will be appreciated however that this may be achieved using other techniques, such as providing each component instance at a respective port, and transferring the data to the respective port.

In any event, when a respective component instance receives the required information the respective component instance implemented by the component server will operate to ensure the respective service is performed. Thus, in the example above, the drafting component outputs the completed patent specification at the output 51B.

The resulting data output from a component will then typically be transferred to the base station 1 or the end station 3 for temporary storage in the memory 21 or the database 11, before being transferred to the input of the next component. Alternatively however the data provided at the output port of a component at one of the entity stations 5 could be transferred directly to another component instance implemented either on another one or the current entity station 5, for subsequent manipulation by the other component.

In any event, in the example above, the specification is transferred to the filing component 52, allowing the specification to be filed. It will be appreciated that this may be performed by the entity that performed the drafting. However, the system provides for the entity to be different. This in turn allows the drafting and filing of patents to be provided as different services by different entities, which allows users to select preferred drafting entities and preferred filing entities based on a wider range of criteria.

It will be appreciated that during this process, respective services may be implemented by a number of components simultaneously, or in sequence, depending on the respective components and the resulting schematic. For example, some components may be adapted to provide certain information, and this can completed as soon as the agents are activated and have established communication between the respective component instances, and the nature of the required information is defined.

It will therefore be appreciated from this and the above description, that parts of the service implementation may begin almost immediately as soon as the build process is started. In particular, as soon as any two agents have connected and required information is ready to be exchanged, this will be performed.

In contrast to that, components which require output from a previous component will await for the output data before commencing to perform the respective associated service.

Furthermore, it is usual for the base station 1, the end stations 3, and the entity stations 5 to be effectively interchangeable or implementable on a common processing system in the examples outlined above. Accordingly, the processing system 10, 15 and the end station 3 will generally execute applications software allowing the functionality of each of the base station 1, the end station 3, and the entity station 5 to be implemented. This allows an entity to use the entity station 5 to obtain a service in the manner outlined above for the end station 3, and vice versa.

Thus, for example, an entity may have a number of processing systems, some of which operate as entity stations 5, and some of which operate as end stations 3, depending on the functionality required at the time. The entity may therefore be providing a number of component services, the implementation of which is distributed across the processing systems. In this instance the functionality provided by the processing systems will be equivalent to either or both of the end stations 3 and the entity stations 5, as required.

It will be appreciated that performing the implementation of components will typically require a support structure, and it is therefore common for the entity to have an infrastructure in place including a number of end stations 3 that will be used in supporting the implementation of the service. This may include for example the provision of patent attorneys. From this it will be appreciated that entities can often provide component services with little or no modification in operation, although the ability to specialise, and therefore be more competitive is vastly increased.

In the case of an entity providing a service, the entity would typically have a number of entity stations 5 that will be automated. However, if an exception, or other error occurs, such that the service cannot be completed, then the entity station 5 will hand-off or transfer the implementation of the service to another entity station 5 that is operated by an individual. This allows the individual to provide manual feedback to allow the exception or error to be resolved, if possible. Otherwise, an indication that the problem cannot be resolved will be returned to another component or entity within the system. Thus, if the problem occurs with a sub-component an indication of the problem will initially be returned to the parent component. This will continue with the exception being passed up the chain until it can be resolved.

Some of the features of the implementation described above, such as the nature and operation of the agents is described in more detail in Appendix A.

Example Implementation

It will be appreciated from the above that the base station 1 allows services provided by a number of different entities, typically at respective entity stations 5, to be accessed centrally by a number of different users. This allows components provided by entities to be reused a large number of times in the provision of numerous different services.

In one example, this in the form of a forum that provides users with means to access the different services. The forum may be implemented using a single base station, as in the example described above. However, persons skilled in the art will appreciate the forum may be implemented using a number of base stations, and a number of associated processing systems, with the forum being distributed between the base stations and the processing systems, which may include the entity stations 5 or the end station 3. The forum operates to provide a mechanism for marketing components to make these available for selection by the users.

The following description therefore focuses on the implementation of the system using a forum, although the techniques are equally applicable to any implementation, such as the use of a single base station.

In use, it is typical for each entity to define a fee associated with each component. This fee corresponds to a fee payable by users of the forum, for the use of a respective component instance service. Thus, the users pay one or more fees to each entity in return for the provision of one or more services provided by the entity.

This allows the entities to charge a fee for the provision of the respective services, thereby allowing the entities to obtain income to recoup the investment made in the development of the respective components.

This in turn allows entities to specialise by providing, and obtaining financial return for, specific well-defined services.

This in turn allows entities to focus on optimisation of a specific service provision, rather than trying to create an entire software application that typically would garner less detailed attention.

By having the forum provide users with access to a number of components, provided by different entities, and which provide similar services, this will force entities to compete against each other to provide similar services to the user. The resulting market forces will therefore drive competition between the entities, thereby forcing each entity to improve the provision of its respective service in order to capture greater market share.

In particular, users will tend to select components that are deemed to be more successful. As a result, entities compete with each other at the component level to provide more and more successful components. This allows the entities to invest more time and money in improving the implementation of the specific components, whilst recouping the investment as more successful components will be purchased a larger number of times.

In this regard, components may be deemed to be more successful if they are cheaper, faster, result in more optimal code, or the like, when compared to other components offering the same service.

From this, it can be seen that market forces and direct competition at a specialisation level will lead to improvement in each service provided through the forum. Thus, each component at every level within the hierarchical structure will be optimised resulting in the performance of services in a more efficient manner. This is enhanced by the standardisation in interaction between different entities through the use of the component specification. In particular, the user selects components that are capable of interacting based on the component specifications, during the schematic creation stage, thereby allowing majority of communication to be performed automatically.

In addition to this however, users can select components in accordance with other criteria. In order to help competition within the forum, the user will be provided with information to allow an assessment of the best components for in perform the required services. The user can then select components in accordance with a wide variety of factors including, for example:

The entity performing the respective service;
The cost;
The location of the entity performing the respective service;
The popularity of the component The data format/types that can be received by or output from the component; and, Ratings given to the component by previous users of the forum or the forum operator.

In this regard, the forum will generally provide a rating system allowing users to rate the effectiveness of components. Ratings can be determined statistically, for example by determining the number of build faults that occurred for each respective component, by user feedback, or by testing of the components by the forum itself.

It will be appreciated that whilst market competition through the use of reviews or the like exist, this is normally provided for entire entities, even though the entity may provide many different services. In contrast, the review and rating in this instance is performed at the component level thereby forcing the improvement of individual component services, as opposed to the entity as a whole.

It will be appreciated that other factors may also be used in judging the success of components.

In any event, in order to remain competitive, each entity will focus on providing well-defined, efficient service implementations, thereby allowing the services to be provided in a more efficient manner.

In order to allow the operators of the forum to make a profit, it will also be typical for at least a portion of any fees charged by the entities, to be provided to the operator of the forum, allowing the operator to obtain profit based on usage levels of respective components. However, alternatively, subscription charges or the like could be applied to individuals wishing to use the system, or registration fee for entities wishing to submit components to the forum.

Further details of the example of the implementation of the processes outlined above will now be described in more detail below.

Accordingly, the above described system allows service implementation to accommodate international competition at every level of the service implementation. This international competition leads to acute specialisation which in turn causes substantial automation, where the specialisation achieves such an understanding of a narrow field that it can be captured and reduced to rules or the like. Once reduced in this way some semi-automatic means can be employed with the aid of a machine to improve productivity. With time and further specialisation this can evolve into fully automated means.

Thus specialisation in the process provides access to both competition and automation. The former results in ever improving quality as options are exercised based on market forces, while the latter greatly improves productivity.

The above system therefore allows services to be performed by selecting and coordinating a number of specialists each of which provide a service. In analogy to building a house by coordinating services like roof truss supplier, a crane operator and transport contractor. The trusses can be manufactured, delivered to the site and erected into place with simple coordination.

Typically the system is embodied in two major parts, workstations and a Forum. In this case, a large number of workstations and a singular Forum are networked together with some kind of LAN Internet, with each workstation being a specialist that is capable of providing some service based on their specialisation. Once the service is implemented and tested the specialist can use the network connection to retail the service via the Forum since potential customers must be aware of the service in order to locate the appropriate workstations and its respective specialist.

The Forum registers and organises advertising for all the services supplied by the specialists at each workstation. Accordingly, required services can be implemented by simply visiting the Forum and noting a particular selection of offered services, embodied in components, that must be combined to perform the required service. Once this has been completed, the respective workstations used in implementing the offered services are contacted to thereby cause the various specialists to perform the necessary work.

Formally encapsulated services are an example of an implementation called Components. As part of the encapsulation process a Component Representation is registered with the Forum.

Any workstation with access to this retail network of services can obtain services, including the specialist's workstations. Workstations can include tools that can encapsulate services for retail and register them with the Forum, as well as tools that implement the services by coordinating them across the network in accordance with a defined component schematic. Thus with suitable tools to both retail and retain services, workstations can be used to allow services to be performed.

In a preferred example, the Forum provides a portal through which the other tools can operate more effectively. For example, rather than visiting the Forum and noting the contact details of a service you would like to retain, the Forum can deliver a graphical symbol that represents the service in question complete with the service description, service retailer location, etc directly from within the coordination tool. This includes all the pertinent information needed to located the retailer should they be required at some future date.

The Forum allows the registration of other useful information in addition to the purchase details. Information like the cost and expected length of time to complete the service are obvious candidates while more interesting information about the outcome of the service like estimated resource usage and performance are exceedingly helpful in making a decision to proceed with construction.

A designer program can be used to create a schematic of the proposed binary considered for construction. A schematic consists of a collection of graphical symbols representing each of the services that make up the construction team. This collection of symbols are arranged and connected so that all the services will have a source for the necessary information to complete their task as well as the destination necessary to deliver their outcomes.

The designer program allows the operator to construct the schematic by opening a portal to the Forum and allowing the operator to select from the products advertised there. In this way the graphical symbols are dragged and dropped from the Forum onto the schematic, arranged and connected.

The portal to the Forum also provides details about the services that are of great assistance to the operator. When the schematic is complete the Designer Program can compute the total cost of the proposed binary, the total time to construct the proposed binary the expected size of the binary and expected performance of the binary.

The operator can then make a judgement on whether to proceed with construction and incur the associated costs, time etc.

Component servers can provide the retail services embodied in the components. When the component is registered with the Forum the component is available for purchase by any entity on the network. The operator should be expecting to perform the service immediately or risk losing business due to unreliable service. It is the component server that presents the retail interface to the network. To be in a position to perform the service the operator starts the component server on the workstation and loads the component that encapsulates the service into the server program. Once loaded the component server program waits for build requests from the network. A build request is a package of data that contains a purchase order for the component, details of sources of information the service requires, details of destinations the service requires, purchaser details etc.

A specific example of the process will now be outlined.

A user decides on requirements for a service. The user starts the designer program on a workstation connected to a network of component severs and a Forum. Using the designer program the user selects a number of component representations from the Forum, which are dragged and dropped onto a new schematic for the service. When all the components are on the schematic they are connected together to satisfy the input and output requirements of the components selected. The schematic is then saved onto the hard drive for access by the component server which will be used to coordinate the construction process.

When the schematic is finished the user makes a decision on whether to build based on the cost, resource usage, schedule etc.

The user then starts a component server and loads the schematic into the server. Once loaded the component server is available to retail the component, which in this case is the schematic. It should be noted however that this component is not registered with the Forum since it is not intended to be retailed.

This is a special case component called the "Root Component". The user then issues a build request to this component server essentially purchasing an instance of this schematic. When the component server receives the build request it scans the schematic and compiles a list of build requests for each of the components in the schematic. These are then issued to the respective component servers over the network. They in turn create a new instance of their component and load their corresponding schematic and issue build requests and so on until all the services are activated.

The users schematic thus decomposes into a collection of manual and automated components scattered across the network. As each service embodied by the respective component is completed the outcome is forwarded to the correct parent component until the binary result is returned to the root component server and the process is complete. The user then has the outcome of the requested service.

Specific Example

A more detailed specific example will now be described with reference to FIG. 15.

Figure 15:
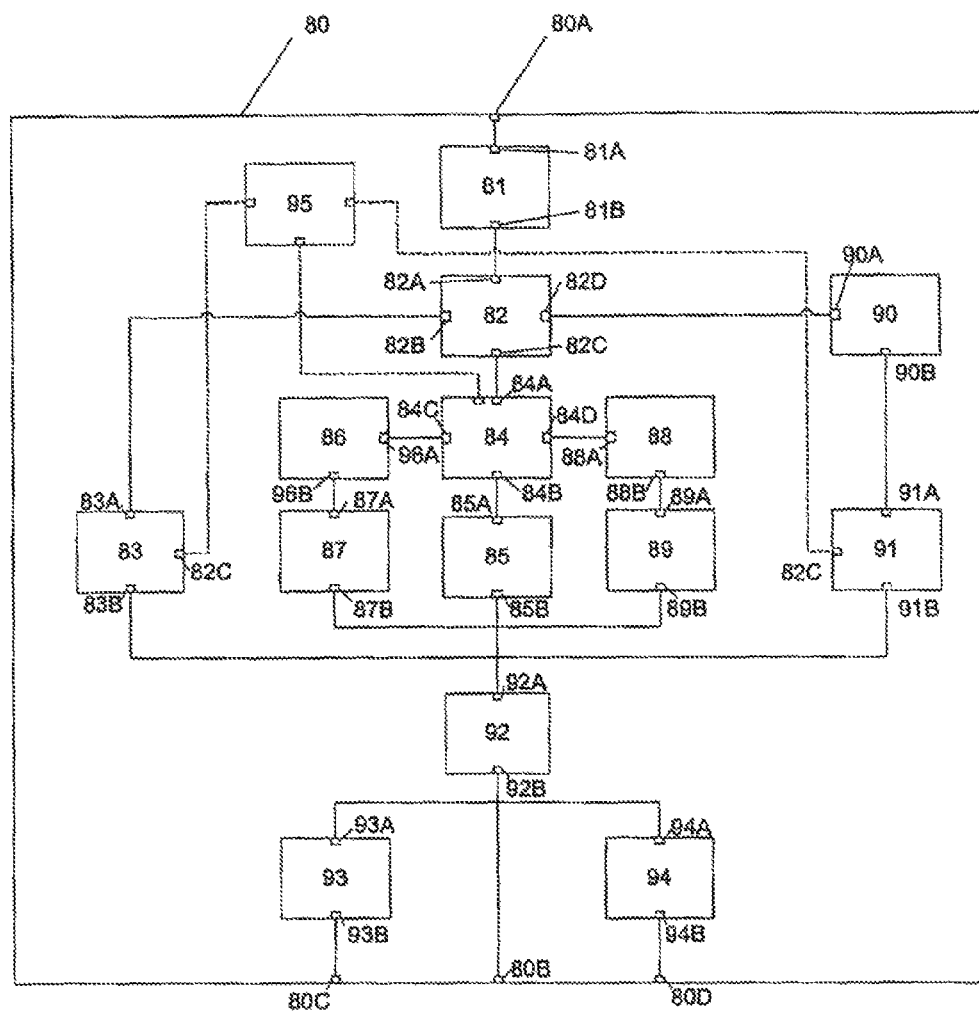
FIG. 15 is an example of a schematic representation for a service that allows patents to be obtained.

In particular, FIG. 15 shows further development of the schematic representation of FIG. 10 to allow foreign patent applications to be filed. In this example the schematic representation includes fourteen basic components 81, 82, 83, . . . 94, each of which includes respective inputs and outputs as shown.

In this example, the component service provided by each component is outlined in Table 1 below, with the function of the inputs and outputs being indicated in Table 2.

TABLE 1

| Component | Name | Component Service |
|---|---|---|
| 81 | Drafting | Preparing patent Specification |
| 82 | Provisional Filing | Filing a Provisional Application |

TABLE 1-continued

| Component | Name | Component Service |
|---|---|---|
| 83 | US Application | Obtaining a US patent |
| 84 | European Application | Obtaining grant of a European Application |
| 85 | UK Validation | Validating the European Application in the UK |
| 86 | French Translation | Translating documentation into French |
| 87 | French Validation | Validating the European Application in France |
| 88 | German Translation | Translating documentation into German |
| 89 | German Validation | Validating the European Application in Germany |
| 90 | Japanese Translation | Translating documentation into Japanese |
| 91 | Japanese Validation | Obtaining a Japanese patent |
| 92 | Granted | Registering details of Granted Patents |
| 93 | Renewals | Policing renewal payments |
| 94 | Monitoring | Monitoring for infringing products |

TABLE 2

| Input/Output | Function | Input/Output Nature |
|---|---|---|
| 80A | Input | Invention Details |
| 80B | Output | Granted Patent Details |
| 80C | Output | Renewal Reminders |
| 80D | Output | Infringement Details |
| 81A | Input | Invention Details |
| 81B | Output | Patent Specification |
| 82A | Input | Patent Specification |
| 82B | Output | Provisional Application Details |
| 82C | Output | Provisional Application Details |
| 82D | Output | Provisional Application Details |
| 83A | Input | Provisional Application Details |
| 83B | Output | US Patent Details |
| 84A | Input | Provisional Application Details |
| 84B | Output | European Patent Details |
| 84C | Output | European Patent Details |
| 84D | Output | European Patent Details |
| 85A | Input | European Patent Details |
| 85B | Output | UK Patent Details |
| 86A | Input | European Patent Details |
| 86B | Output | French Translation of European Patent Details |
| 87A | Input | French Translation of European Patent Details |
| 87B | Output | French Patent Details |
| 88A | Input | European Patent Details |
| 88B | Output | German Translation of European Patent Details |
| 89A | Input | German Translation of European Patent Details |
| 89B | Output | German Patent Details |
| 90A | Input | Provisional Application Details |
| 90B | Output | Japanese Translation of Provisional Application Details |
| 91A | Input | Japanese Translation of Provisional Application Details |
| 91B | Output | Japanese Patent Details |
| 92A | Input | US/German/French/UK/Japanese Patent Details |
| 92B | Output | Patent Details |
| 93A | Input | Patent Details |
| 93B | Output | Renewal Information |
| 94A | Input | Patent Details |
| 94B | Output | Infringement Details |

Accordingly, in this example, the user of the end station 3 desires patents to be obtained in US, Germany, France, UK and Japan. The user selects the components outlined above and arranges these to form the component schematic shown in FIG. 15 using the techniques outlined above.

It will be appreciated that this will require the user to have an understanding of the patent system. However, this may be overcome by providing a single component 80, which the user can select to obtain the required patents, with the components 81, . . . 94, representing sub-components.

In any event, once the schematic has been constructed, the user can instruct the schematic to be implemented in the manner described above. Accordingly, the base station 1 or the end station 3 will generate purchase orders which are transferred to respective entity stations 5 to activate component instances thereon, and begin the agent negotiation process.

Once this is completed, the service can be performed.

Thus, for example, the agent for the input 80A will communicate with the agent 81A to determine the form of invention details that are required by the drafting component 81 to prepare the specification. This will typically depend on a number of factors such as the subject matter, the complexity of the invention or the like. Furthermore, the agents will negotiate to where the invention details should be transferred, which will also typically depend on the above mentioned factors.

Accordingly, in this instance, the agent 81A will typically be adapted to supply a list of questions regarding the invention to the agent 80A. The user will be prompted by the agent 80A to provide appropriate responses, which are then transferred to the agent 81A for analysis. Following this, the agent 81A will transfer a list of requirements to the agent 80A, together with contact information, allowing the invention details to be submitted to the entity implementing the component 81. In this case, for example, this will typically be a patent attorney, and the agent 81A will therefore provide an e-mail address or the like of a selected attorney. Alternatively, the components can agree to transfer using a particular protocol and hand-off these objects to respective sub-components skilled in that protocol, as will be appreciated by persons skilled in the art.

It will be appreciated that in order to implement this, the component 81 may include a number of sub-components corresponding to different attorneys, with the respective sub-component being selected by the agent 81A, in accordance with responses and/or invention details received from the user, via the agent 80A.

Having received the invention details, the entity will prepare the patent specification as required.

Once this is completed, or simultaneously with the above mentioned procedure, the agent 81B will communicate with the agent 82B to establish a connection between the components 81, 82. In this instance, the filing component 82 may be the same entity as above (in which case the agent communication will establish this and end the process), or a different entity (in which case the agents 81B, 82A will establish a communication channel such as via e-mail). When the patent specification is completed, this is supplied by the component 81 to the component 82 for subsequent filing as a provisional application.

In this case, it will be appreciated that the attorney drafting the specification can save the completed specification in a predetermined location on the respective entity station 5, allowing the drafting component instance to automatically transfer the completed specification to the filing component 82. This allows the attorney performing the drafting process to focus solely on the drafting, avoiding the need to check that the specification is correctly filed as this is, in this example, no longer their responsibility.

Similarly, the filing component 82 will receive the patent specification, allowing the responsible entity to file the provisional application. It will be appreciated that this may be an automated system and need not require manual intervention, depending on the circumstances.

Once the provisional application has been filed, details of this, including a copy of the patent specification may be passed onto the components 83, 84, and 90. In this example, the filing component 81 provides a single output for providing both details of the provisional application and the filed specification to the subsequent components, whereas in the example described above, the component 52 includes two outputs, one for the details and the other for the specification. It will therefore be appreciated that these represent two alternative filing components which operate in a slightly different manner, as reflected by the difference in the component structure.

The components 83, 84, are responsible for filing and prosecuting patent applications in the US and Europe respectively. These components would therefore typically be implemented by patent attorneys within the respective jurisdictions. It will be appreciated however, that again, each of the components 83, 84 may contain several sub-components, with various aspects of the filing and prosecution being sub-contracted to different entities, or different individuals or automated processes within the entity.

This automated distribution of the work in accordance with the defined schematic vastly reduces the amount of work required by the entities and any individuals within the entities, allowing the entities and individuals to focus on specific well defined tasks, rather than a wide range of tasks. This, in turn allows the entities and individuals to focus on providing improved service in those well defined task areas.

In the example above, the translation component 90 operates to translate the received provisional application details and specification, before transferring the translated details to the component 91 for subsequent filing and prosecution as a Japanese patent application. It will be appreciated that as translation software becomes more effective, the translation components could be implemented automatically depending on legal requirements.

In the case of the European application, once this is granted, it then needs to be validated in countries of interest, which in this case includes UK, Germany and France. Accordingly, this will typically be performed by entities in the respective countries, with translations being obtained as required.

In this example, once the patents have been granted, details are transferred to the granted component 92, which distributes details of the granted patents (typically including a copy of the granted specification) to the user via the output 80B, and to the renewal and infringement components 93, 94. The renewal component 93 calculates the renewal fees to be paid and alerts the user to these via the output 80C. Similarly the infringement component 94 operates to monitor competing products and the patent to determine any potential infringements, which can then be notified to the user.

However, the schematic may be implemented using one-to-one connections. In order to achieve this, the outputs of the components 87,85,89 could be combined by a bundler component, to allow a single bundle to be presented to the component 92. Similarly, the component 92 may be coupled to a duplicate component, adapted to duplicate the output provided at the output 92B and provide this to the components 92, 94, again via one-to-one connections.

It will be appreciated that the above described example is a major simplification on the schematic that would normally be used, not least because user feedback would normally be required at a number of stages throughout the process. However, it will be appreciated that this can be achieved through the use of suitable components, one of which is shown additionally at 95. In this case, the component 95 is a feedback component used to provide feedback to the components 83, 84, 91, during prosecution. This allows the user to have control over the prosecution of the application, for example by deciding whether to proceed with the case in the light of relevant prior art, to suggest claim amendments, or the like.

Accordingly, in this case, the connections between the components 95, 83, 84, 91 are two way connections allowing two way communication.

It will be appreciated that additional features may also be provided, such as making the implementation of certain components dependent on the completion of previous components in the schematic. Thus for example, if the patent applications are not granted due to the presence of prior art, then there is no need to implement the components 93, 94. This can be used to reduce the amount of work performed by the system, with the components 93, 94 only being implemented when required.

Furthermore, the components may be adapted to retain control over the process for a predetermined amount of time. Thus, for example, the filing component may retain the filing details and specification for ten months, such that the European, US and Japanese applications are only filed near the end of the priority year.

A further feature shown by the schematic in FIG. 15 is that some inputs and outputs are one-to-one in the sense that each input connects to one output. In contrast however, other inputs or outputs, such as the input 92A and output 92B are many-to-one, or one-to-many respectively, in that each input or output may connect to many outputs or inputs respectively. Again, this will depend on the respective implementation of the components.

General

Accordingly, in one example, the above described systems allows users to obtain services by defining combinations of components. In this case, each component corresponds to a respective service portion and accordingly, the component combination defines a sequence of service portions which when performed will result in the desired service being performed.

The components are generally provided by respective entities which are capable of performing the service portion defined therein, and this may be achieved either manually or through automated procedures.

Accordingly, in order to allow a user to define a suitable component combination, the components are usually made available through a centralised system, which is often referred to as a forum. This is typically implemented by one or more processing systems and may be achieved by having the forum receive formal definitions of the components in the form of component specifications.

In order to allow the data manipulations to be performed, it is necessary to be able to define the component combination with sufficient detail to allow the components to interact. In order to achieve this, in the examples described above, a schematic is defined which sets out the components to be used, and the interactions therebetween. The schematic is typically defined using a suitable GUI, which therefore allows users to select components presented on a forum, drag and drop these into the schematic, and define suitable connections between the components to define the component interactions. In this regard the forum is provided by one or more processing systems that operate as a portal to provide access to the component specifications.

Once the schematic is completed, this may then be implemented by generating a respective component instance for each component in the schematic. Each component instance may be created on a respective component server which is typically implemented using a processing system provided by the respective entity. In use, when the system is implemented, information may be transferred between the respective component instances with at least some of the component instances performing required service portions as required.

It will be appreciated that the component instances should be capable of communicating with each other, and in particular, should be capable of transferring information and/or data in a form that can be understood by both components.

In one example, this is achieved using agents, with a respective agent being provided for each component port. Thus, an agent associated with a port on one component will cooperate with an agent associated with a port output on another component. Whilst the ports are generally used for bi-directional exchanges of information, there is often a directionality associated with the transfer of data and the ports are therefore commonly referred to as inputs and outputs.

Communication between agents is typically achieved by transferring messages including a header with address information and a payload containing any data to be transferred. The interaction between the agents can be as simple as causing one agent to send a message to another agent, with no further communication occurring. Alternatively a two stage process may occur including negotiation followed by information transfer. In this case, the agents will first negotiate with each other to determine information which to be transferred between the respective components, before proceeding with the information transfer as required. Thus, during negotiation, the payload will typically include a list of required information that may be handled by the agent, the component or the like. In the case of transferring information this will be included in the payload.

Thus, in one example the agents represent the only form of interaction between the components.

When a schematic is implemented, this can be achieved by sending purchase orders to each entity providing components within the schematic. Each entity can then construct a respective component server including a respective component instance together with any associated agents. Once this has been completed, the agents perform any required negotiations before transferring information between the components occurs in order to allow the components to perform the respective service portion embodied by the component.

In this example, an entity receives a purchase order for a respective component this will specify connections that need to be formed between agents associated with the component, and other agents. In particular, this will include the agent addresses of the other agents so that when the component instance and corresponding agents are constructed, the agents will be able to communicate directly with the other agents.

As the above techniques capture how the service is performed this provides an IP protection mechanism for protecting the supplier's IP. That is, "how" the service portion is performed is never exposed to the customer.

Accordingly this provides a completely new process for implementing services. In particular, this can be used to:
 Add a competitive element to software development.
 Allow supplier specialisation.
 Creating an industrial style service supply chain.
As a result, the process can:
 Allow for competition between component suppliers by allowing component suppliers to compete directly to provide respective services.

Protect the IP of suppliers and clients.

Allow for the development of component supply chains.

Provide a fully distributed component processing engine.

In a preferred form the implementation is aided through the use of the following tools:

Component Designer—an application supporting visual assembly of components.

Component Public and Private specification files—for defining components in a predetermined format such as XML.

Component Server—an application supporting the supply of services as specified by the component public specification file;

A set of server-to-server communication messages embodied by agents, that coordinate the serving of a component.

Supply Chains

The described processes support industrial type supply chains. In this case, when a purchase order for a given component arrives with a supplier, a Component Server deployed at the component vendor's site automatically generates purchase orders for the required sub-components. Such automation creates an efficient "just-in-time" component supply chain.

Distributed Construction

The process supports truly distributed service implementation by formalising the implementation of the service portions, thereby allowing the service portions to be implemented separately but in an integrated fashion. This cam be used to allow service portions to be implemented by entities throughout the world with this process being transparent to both users and implementing entities.

It will be appreciated that similar schematics may be constructed for an almost limitless range of service industries. This includes industries such as law, accountancy, financial services, insurance, management consultancy, or the like. This list is not intended to be exhaustive, and the use of suitable components will allow the techniques to apply to any industry.

Thus, in one example, the formalisation of the service implementation in the form of components allows different service portions to be selected and combined by users, thereby allowing services to be obtained. This allows the user to retain control over the service portions used in the performance of the respective service, whilst allowing service portions implemented by different entities to be integrated seamlessly into an overall service performance method.

Persons skilled in the art will appreciate that numerous variations and modifications will become apparent. All such variations and modifications that become apparent to persons skilled in the art, should be considered to fall within the spirit and scope that the invention broadly appearing before described.

Appendix A

Further examples of techniques for implementing the processes outlined above will now be described Agents In the examples above, agents are the only form of inter-component communication. Agents are responsible for providing and gathering all the information a component needs to complete the service it embodies. An agent is generally formed from a simple piece of executable code with limited functionality, and this may form part of, or be implemented by the component server. In use the agent is adapted to communicate with agents of other components via respective ports. The agents typically communicate by transferring messages as will be described in more detail below.

In particular, when the end station 3 sends out purchase orders to the entity stations 5, the reception of a purchase order causes each entity station 5 to implement a component server to generate a new component instance, and corresponding agents that are capable of finding and connecting to the agents of other components. This may be performed as described above, or for example by having connection details specified in the purchase orders. The agents only ever connect to (communicate with) other agents, although manual interaction with the agent as part of the performance of the data manipulation may occur.

Figure 16:
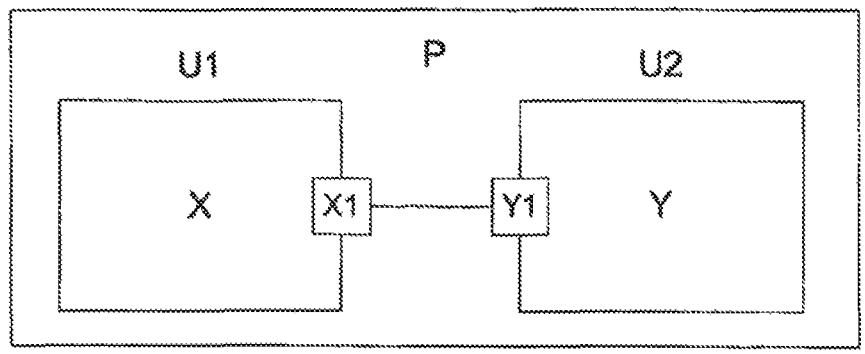
FIG. 16 is a schematic diagram of an example of a schematic representation for two interconnected components.

In particular, an example will now be described with reference to FIG. 16, which shows a schematic P having components X and Y connected by agents X1 and Y1.

In order to specify the address of a particular agent for a particular component instance, it is necessary to be able to identify the agent uniquely. Accordingly, for the purposes of this example, the component X is manufactured by an entity having a manufacturer ID IDx, and component Y is manufactured by a an entity having a manufacturer ID IDy.

When schematic P is laid out, the component representations for the components X and Y are downloaded, typically as part of the component specification, arranged and connected in the schematic representation P using the method described above with respect to FIGS. 10A to 10E. As the schematic is constructed, each component is given a unique label, as shown at U1 and U2. These labels allow schematics with more than one component of the same type to reference the correct instance of that component.

Associated with the respective component representations are the component specifications, including the manufacturer ID, and part number. The component specification will include input and output specifications detailing the agents, which for this example is exactly one for each component.

Before the schematic can be built, the user creating the schematic P must be specified so that the entities IDx, IDy can bill the user. In this example, the user is given an identifier IDp. Once this information is contained in the schematic it is ready to be built.

The process of building a schematic results in a number of entities being contracted with purchase orders. Thus the decision to build will incur costs and contractual responsibility. A mistake in the schematic may result in a bad build wasting time and money.

Assuming the build is to proceed, the next step is to submit schematic P to the builder program. The builder program interprets the schematic and compiles and issues purchase orders for each component in the schematic. The purchase orders for the component X would contain the following information:

Base station identifier 1
   Schematic identifier P
   X component label U1
   Entity identifier IDx
   Entity part number X
   Component X agent connection details, including:
      Entity identifier IDy
      Entity part number Y
      Component Y agent number Y1
      User's identifier IDp
      Schematic identifier P
      Y component label U2

The purchase order for the component Y would include similar information.

Should the component being purchased have more than one agent, then each agent must have separate connection details included with the purchase order specifying each agent's respective target.

When the entity IDx receives the purchase order from the user IDp, the entity IDx creates an instance of the component using a component server. At this point, the agents are created by executing the code associated with each of the agents.

After the provision of the purchase orders, the respective instance of the component X now has the information it needs for the agent X1 to communicate with the agent Y1.

In a basic example, if the agents are only adapted to perform single event transactions, then the only form of communication is for one of the agents, in this example the agent X1 to generate a message including a header and payload. The header will specify routing information needed to the transfer the message to the agent Y1, whilst the payload will contain any data to be transferred.

The message will be transferred to the agent Y1, which will receive the message and extract the data from the payload. With the task complete, the agents can terminate.

However, alternatively the transaction may be a multi-event transaction, in which case the agents will operate to connect and perform multiple transactions, such as to perform negotiation. In this case, one of the agents will generate a message including a header and payload, as before. In this case, the purpose of the message is to establish communication, and accordingly, the nature is not important, although it may contain information used to authenticate the agents to each other.

In any event, once communication has been established, the multiple messages can be transferred between the agents as required, for example to allow agent negotiation to be performed.

Figure 17:
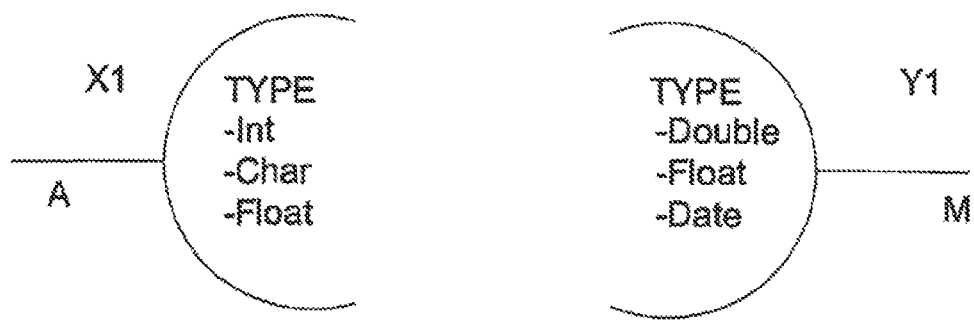
FIG. 17 is a schematic diagram demonstrating the operation of the agents of FIG. 15.

Thus, for example, in the event that the agents are adapted to handle the data types shown in FIG. 17, the agent X1 can handle integers INT, characters CHAR, and floating point numbers FLOAT, whereas the agent Y1 can handle double inputs DOUBLE, floating point numbers FLOAT, and dates DATE. Accordingly, the agents will determine the component X must provide the output in the form of floating point numbers FLOAT.

From the above it will be appreciated that the agents are the only form of inter-component communication. As a result the agents must be able to communicate via the communications networks 2, 4.

Thus in the example described above, the agent of the output 51B will operate to connect to the agent of the input 52A. The agents will determine how the patent specification is to be transferred, and this may therefore represent no more than the provision of an e-mail address or the like, to allow the specification to be e-mailed from the entity providing the drafting services to the entity providing the filing services. Alternatively more complex information may be transferred, such as the desired format of the specification, any security passwords to be used to protect the document, or the like.

Whilst the agents are themselves simple, processes called bundling and hand-off allow agents to exhibit complex behaviour and powerful information providing and gathering capabilities.

The hand-off mechanism terminates an agent to agent transaction and opens another. This is most useful when a component is using the agent of a sub-component as if it were an agent on the component itself. Worked examples help to clarify the hand-off procedure and an example of band-off to a sub-component is presented.

Bundling is a recursive mechanism by which multiple agents related by a specific purpose can be treated as a single simple agent. Worked examples help to clarify the bundling and debundling mechanism and an example of bundling and debundling components are presented.

Component Server

The component server is a software application provided at the entity stations 5 to allow the entity stations to implement components. In particular, the component server is adapted to receive a purchase order generated by the end station 3, and then use the purchase order to create a new component instance, together with appropriate agents.

Once this is completed, the local component server activates the agents associated with the component, in a process hereinafter referred to as presenting the agent. All agents by definition are connected to another agent associated with another remote component. When an agent is presented, it is made available for interaction with its counterpart operating in its remote component server.

Upon receiving the purchase order from the end station 3, the component server will initiate the construction of the component instance that is to perform the service in the respective build process.

In order to achieve this the component server operates to:
Submit purchase orders PO to the entities supplying the services associated with the respective components;
Provide the data required to each of the sub-components to allow each of the sub-components to perform the services defined therein; and,
Supply sub-component agent addresses to allow the components to be erected once their agents have terminated.

In general, the component server contains many components at various stages of erection but for the purposes of the following explanation the component server will only operate on one component.

Hand-Off

In addition to agents making a static connection there exists an agent hand-off mechanism. The agent hand-off mechanism allows an agent to agent connection to terminate with one of the agents reconnecting to yet another agent.

This behaviour provides a means by which multiple agents can be managed as a simple agent. This is achieved by a component performing some simple information transaction then handing the agent-off to another component to negotiate further. With only these simple transactions a complex overall transaction can occur with from appearances, a single component.

In particular, hand-off allows a component to present a service that internally is made up of carefully crafted arrangement of sub-components or processing. Thus although a component presents a number of agents and appears to perform a given service, in actual fact the service is supplied by many sub-components which have at least some of their agents satisfied by a hand-off from a parent agent. In order to achieve this, an agent of the parent must first connect to some outside component, then order that agent at the other end to connect to a sub-component.

A walk through of the hand-off mechanism demonstrates the steps involved in the hand-off process.

Figure 18A:
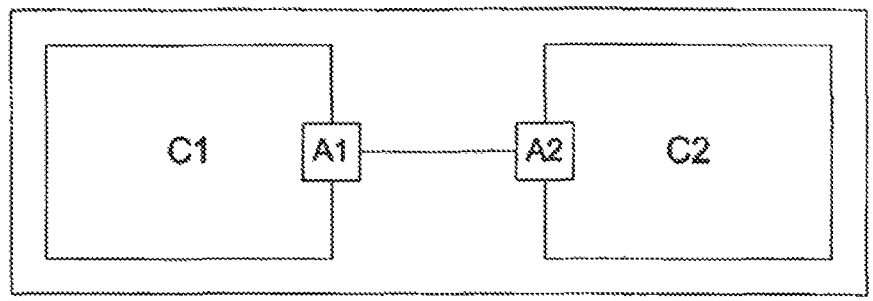
FIG. 18A to 18E are schematic diagrams of an example demonstrating the operation of hand-off of agents.
Figure 18B:
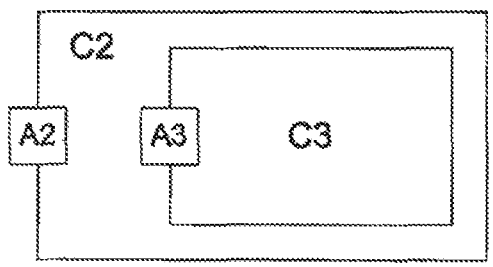

FIG. 18A represents a schematic involving a hand-off. In FIG. 18A agent A1 of components C1 and agent A2 of component C2 connect as normal, however C2 has sub-component C3 as shown in FIG. 18B.

Figure 18C:
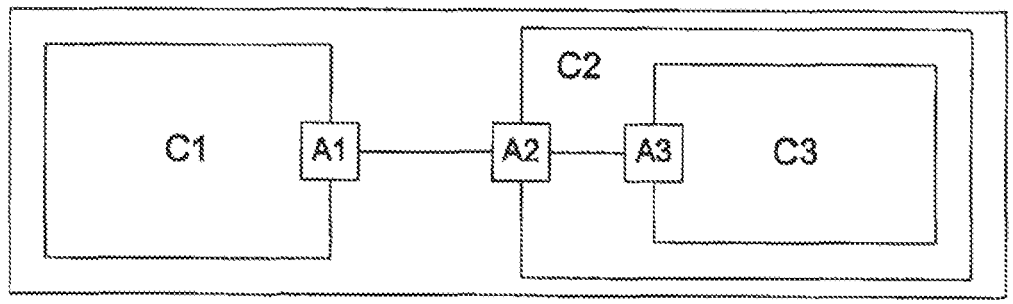

The component C2 intends to hand-off the agent A1 to the agent A3 of the sub-component C3 as shown in FIG. 18C.

Figure 18D:
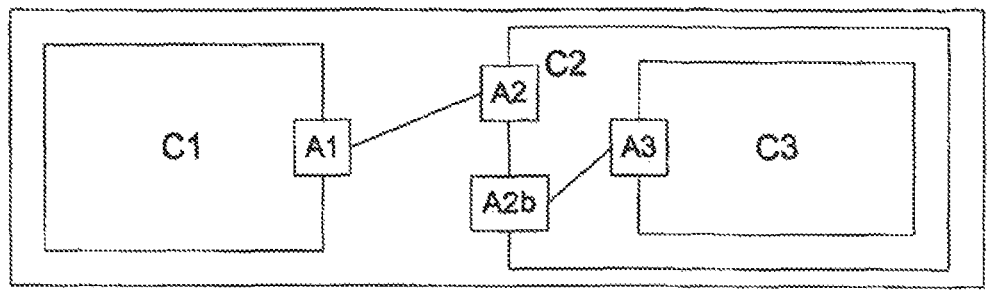

To simplify the agent protocol, it is assumed that each agent only connects to one other agent at a time. Thus the agent A2 could not connect to the agents A1 and A3 at the same time. As a result of the agent A2 being connected to the agent A1, it is not possible to include details of the agent A2 in the purchase order that causes component C3 to be generated. To allow the component C3 to be built and access to the agent A3 to be gained, a temporary agent A2b is created as shown in FIG. 18D.

The details of agent A2b can be included in a purchase order, allowing the component C3 to be built and the agent A3 to connect to agent A2b providing means for the component C2 to communicate to the component C3. When the agent A1 is connected to the agent A2 and the agent A2b is connected to the agent A3, the component C2 can direct the agents A2 and A2b to terminate and cause the agent A1 to reconnect to the agent A3

Figure 18E:
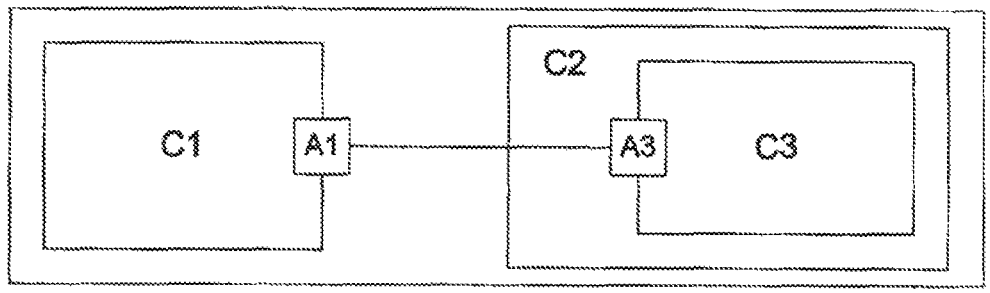

Thus, the component C2 uses the local agents A2 and A2b to communicate the hand-off order to the agents A1 and A3 respectively, resulting in the agents A1 and A3 connecting as shown in FIG. 18E. This is generally achieved by having the agents exchange the identifiers of A1 and A3, allowing them to connect directly.

Figure 19:
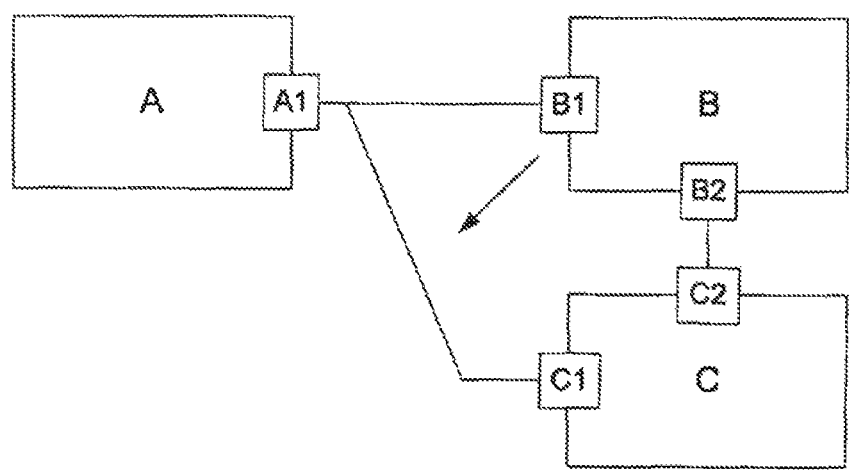
FIG. 19 is a schematic diagram of a second example demonstrating the operation of hand-off of agents.

An example of the hand-off mechanism handing from one component to another will now be described with reference to FIG. 19. In particular, in this example, the schematic includes three components A, B, C, each of which has respective agents A1; B1, B2; C1, C2.

In this example, the agent A1 gets the address of the agent B1 from the schematic purchase order. Similarly the agent B1 gets the address of the agent A1 from its schematic purchase order. Using the agent connection mechanism outlined above, agents A1 and B1 connect and authenticate.

Agents A1 and B1 perform their information transfer, which results in the agent B1 deciding to hand-off the agent A1 onto the agent C1. The component B obtains the agent address of the agent C1 by having the agent B2 communicate with the agent C2. The agent B1 then uses its authenticated link to the component A, and sends a hand-off request together with the agent address of the agent C1.

The agent A1 simply disconnects from the agent B1 and connects with the agent C1. Should the agent C1 be busy with a connection elsewhere. The agent A1 simply waits for the agent C1 to become available. Similarly the component B obtains the address of the agent A1 and transfers this to the agent C1, allowing the agent C1 to reconnect to the agent A1. Thus, the connection between agents A1, B1 and agents B2, C2, is handed-off as shown by the arrow, to result in a connection between the agents A1, C1, as shown.

As mentioned above, the agents may be no more than a "dumb" interface to allow manual negotiation and data transfer, for example through a chat or e-mail type interface.

It will be appreciated that hand-off is not strictly necessary in single event transaction systems, as the messages can simply be forwarded on to subsequent agents.

Combining Agents

As described above, each agent interacts with one other agent, which is typically associated with another component. In general, components may include many inputs and outputs and therefore may have many agents. If it were necessary for individuals to define connections between each agent of each component when creating the schematic, the task would be onerous in situations where a large number of related connections are to be made.

Accordingly, it is typical for related agents to be combined, thereby allowing a single connection to be defined. This may be achieved using complex payloads and/or bundling.

Complex payloads are formed when the payloads from each of the agents are combined into a single payload. In this case, a component P having sub-components A, B, C could have a single external agent, which provides a single payload which corresponds to a concatenation or other combination of each of the payloads of the agents of components A, B, C. In this case, the single agent can be presented to a component Q having sub-components D, E, F. In this case, in order for the sub-components D, E, F to interact with the data, it is necessary for the complex payload to be deconstructed by the component Q, to allow respective individual payloads to be formed, which can then be provided to the agents of the components D, E, F.

In the case of bundling, agents are combined via the use of a bundle component such that two or more agents are effectively treated as a single agent. An unbundling component is then used to deconstruct component bundles as required. This in turn allows agent band-off to be implemented so that agents not actually involved in any interaction can transfer the interaction requirements to other agents as described above.

This allows complex interactivity between multiple components whilst presenting to the user as a simple single agent.

Bundling

Often a component will require a number of agents to resolve information for a specific task. Since these agents are sometimes related it makes sense to group the agents into a bundle to hide the complexity and so deal with the bundle like a single agent. This greatly simplifies the schematic and reduces errors.

Thus, the purpose of the bundling is to manage agents more effectively. Although not strictly necessary bundling allows related agents to be attached to each other so that their relationship is preserved making the management of large numbers of agents an easier task.

Special components provide the service of bundlers/debundling and these will hereinafter be referred to generally as bundlers. In this example, bundlers have three agents—two "inputs" and an "output", whereas bundlers operating to debundle (which may be referred to as "debundlers") have two "outputs" and an "input". The terms output and input are in inverted commas as the bundler and debundler perform almost exactly the same task. They both gather the addresses of a pair of agents and send it through a third agent, however the bundler is the one that initiates the communication, and so gathers the addresses first—making the pair of agents inputs and the lone agent an output. As soon as the debundler has received the addresses through its input the roles are reversed. Once the bundler and debundler have swapped agent information, they hand-off the connected components to each other and retire. If either of these connected components is a bundler or debundler, the process begins again.

Figure 20A:
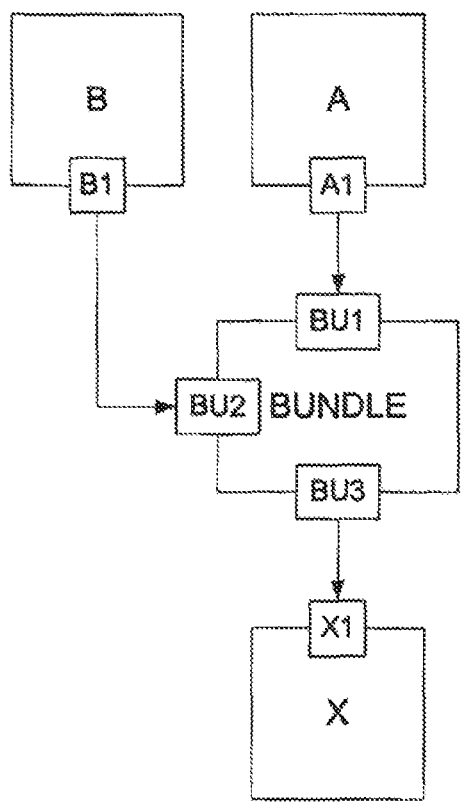
FIGS. 20A and 20B are schematic diagrams demonstrating the operation of agent bundles.

FIG. 20A represents two agents A1, B1 from respective components A, B coupled through a bundle component BUNDLE, which provides bundle agents BU1, BU2, BU3. The bundle agent BU3 is used to connect to the component X. The bundle agents BU1, BU2, BU3 are indistinguishable from a normal agent.

In use, the component BUNDLE depicted in FIG. 20A receives connections from the agents A1, B1 and presents the agent BU3. The role of the agent BU3 is to provide the addresses of the agents A1, B1 to the component X.

In the example shown in FIG. 20A, the components A, B, X receive addresses of the agents BU1, BU2 and BU3 respectively from the schematic purchase orders. Similarly the bundle component BUNDLE gets the agent addresses A1, B1 and X1 from a respective schematic purchase order. The agents A1, BU1 connect and authenticate while the agents B1, BU2; and, X1, BU3 do the same. The component X negotiates with the component BUNDLE and determines that the payload of the agent BU3 represents a bundle.

Figure 20B:
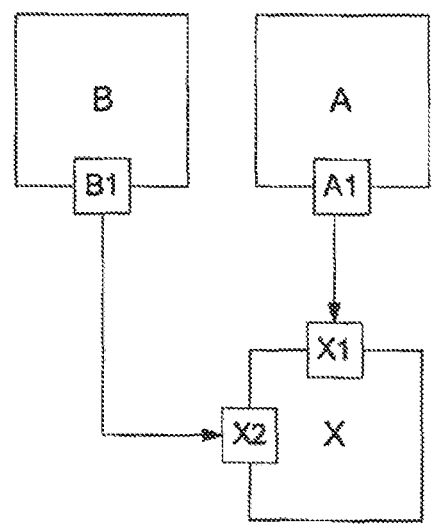

Accordingly, by using the hand-off mechanism as described above, the component X can determine the addresses of the agents A1, B1, and order the bundle component BUNDLE to hand-off A1, B1 as shown in FIG. 20B. Thus, in FIG. 20B the component X through agent BU3 learns of the agents A1, B1. The component X then orders the bundle component BUNDLE via the agent BU3 to hand-off the agents A1, B1 to the agents X1 and X2 respectively. The bundle component and its respective agents has then completed it's service and can retire.

Figures 21, 22:
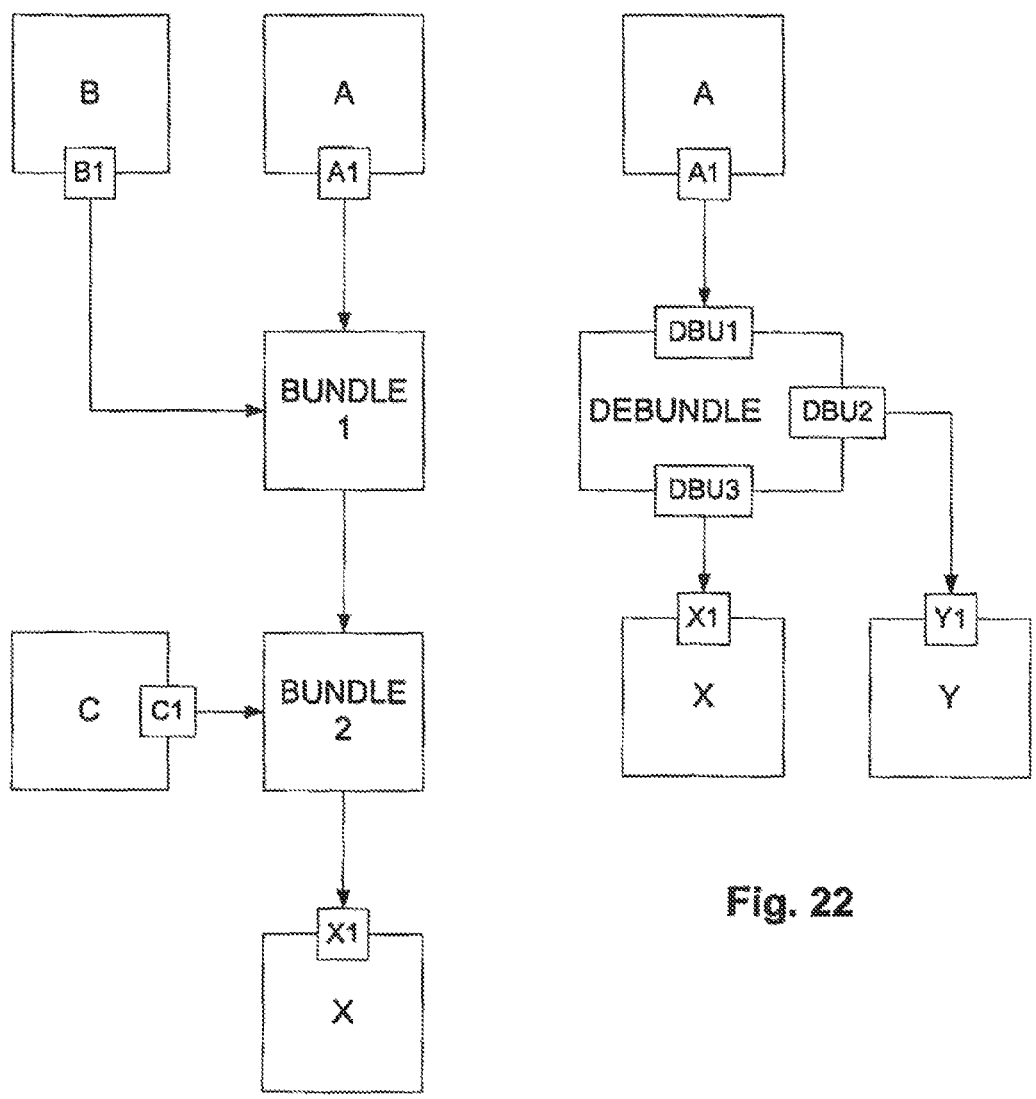
FIG. 21 is a schematic diagram demonstrating the operation of a sequence of agent bundles; and, FIG. 22 is a schematic diagram demonstrating the operation of a debundle component.

The bundling component BUNDLE as shown in FIG. 21 has no concern as to the nature of the agents A1, B1. As far as the bundling component is concerned, they are any two agents and their payload is irrelevant. This enables cascading of bundling components as shown in FIG. 21. Any number of bundling components may be cascaded.

In addition to providing bundle components for bundling agents, debundling components are provided for performing the opposite function.

An example of this is shown in FIG. 22, in which a component A is coupled to a debundling component DEBUNDLE, which in turn is connected to two components X, Y, as shown. In this example, the debundling process starts with the component agents A1, DBU1; DBU3, X1; and DBU2, Y1 connecting and authenticating as specified in the purchase order.

The debundling component then learns the addresses of the two agents represented by the bundle. It then requests X1 and Y1 to hand-off in accordance with the addresses provided by agent A1. At this point the debundling agent has then completed its service and can retire.

Some very complex patterns of bundling and debundling can be used provided that the patterns are symmetrical around the link going between the bundlers and the debundlers. These patterns can span across multiple components and multiple levels of the component hierarchy, allowing combinations of agents to be treated as a single agent, as will be appreciated by a person skilled in the art.

Hierarchical Bundling

It is typical for agent bundles to include a large number of agents, up to for example a hundred or more. In order to improve the efficiency of the bundling/debundling process, it is typical for agent bundles to be arranged hierarchically so that those agents or bundles of agents which need to be accessed on a large number of occasions are more easily accessible.

A number of different hierarchy structures may be used, such as linear, or dynamic hierarchies or structures reflecting the application.

The claims defining the invention are as follows:

1. A method of allowing a user to obtain a service using a processing system including a base station coupled to a plurality of component processing systems via a communications network, the method utilising components, each component corresponding to a respective service portion performed by a respective entity using a respective one of the component processing systems, the components including one or more inputs for receiving data and/or one or more outputs for outputting data, the method including causing the processing system to:
   a) Provide component specifications to the user for a plurality of different components, the component specifications being indicative of:
      i) The respective service portion associated with the corresponding component; and,
      ii) Data to be received by inputs and/or output from outputs of the corresponding component;
   b) Determine a combination of components in accordance with input commands received from the user for selecting a plurality of components and defining interconnections between at least some of the selected components based on the component specifications, the interconnections representing transfer of data between the respective entities of the respective components and being defined between one or more of the outputs of at least some of the components and one or more of the inputs of at least some other components in accordance with the respective component specifications, the defined component combination defining a sequence of service portions; and,
   c) Implement the components in accordance with the component combination, thereby causing the sequence of service portions to be performed, such that the desired service is performed, each component in the component combination being implemented by:
      i) Generating a service request for the component using the component specification, the service request including an indication of interconnections associated with any inputs and/or outputs of the component; and,
      ii) Transferring the service request to the respective component processing system via the communications network, each component processing system being adapted to respond to the service request to cause the respective service portion to be performed, wherein:
         (1) At least some of the component processing systems cause the respective service portion to be performed by:
            (a) Receiving data via inputs in accordance with the service request;
            (b) Causing the data to be manipulated by modifying the data or creating data to provide manipulated data; and
            (c) Outputting the manipulated data via outputs in accordance with the service request; and,
         (2) At least some of the component processing systems cause the data to be manipulated by:
            (a) Generating further service requests for each of a number of sub-components associated with the respective component;
            (b) Transferring the further service requests to respective component processing systems to cause the sub-components to be implemented, at least some of the sub-components causing the data to be manipulated; and,
            (c) Receiving the manipulated data from at least one of the sub-components.

2. A method according to claim 1, the base station being coupled to one or more end stations via the communications network, the method including allowing the user to use the end station to:

a) Select one or more of the components; and,
b) Define a component combination using the selected components.

3. A method according to claim 2, the method including causing the base station to:
a) Receive a component request from the end station; and,
b) Transfer an indication of one or more components to the end station in accordance with the request, thereby allowing the user to select one or more of the components.

4. A method according to claim 3, the method including causing the base station to:
a) Receive a component selection from the end station, the component selection indicating one or more selected components; and,
b) Transfer component specifications of the selected components to the end station in response to the request, thereby allowing the user to define the component combination.

5. A method according to claim 4, the method including causing the base station and/or the end station to:
a) Generate a graphical representation of the selected components; and,
b) Manipulate the graphical representation in response to input commands received from the user to thereby define the component combination.

6. A method according to claim 5, the method further including causing the base station to:
a) Obtain a graphical representation of the selected components;
b) Transfer the graphical representations to the end station.

7. A method according to claim 6, the method including causing the base station and end station to implement the combined components in accordance with the generated graphical representation.

8. A method according to claim 2, the base station including a store for storing component specifications and a processor, the method including causing the processor to:
a) Access the component specifications stored in the store; and,
b) Provide indications of the service portions provided by the components and data to be received by inputs and/or output from outputs of the components to the end station, thereby allowing the user to select respective ones of the components.

9. A method according to claim 8,
the method including allowing the user to define the component combination by connecting inputs and outputs of the selected components using the end station.

10. A method according to claim 1, the method including:
a) Determining any information required by the components; and,
b) Providing the information in the service request.

11. A method according to claim 1, the method including causing each component processing system to:
a) Implement one or more respective component instances in accordance with the received service request; and,
b) Cause each component instance to:
i) Interact with other components in accordance with the interconnections defined nin the service request; and,
ii) Perform any required information manipulations.

12. A method according to claim 1, the method including causing each component processing system to:
a) Implement a respective agent associated with each input and output; and,
b) Cause each agent to cooperate with an agent of another component in accordance with the defined interconnections, to thereby allow data to be transferred between the respective entities of interconnected components.

13. A method according to claim 1, the entity being adapted to perform the service portion by:
a) Receiving the data to be manipulated at an input;
b) Performing the data manipulation; and,
c) Providing the manipulated data at one of the outputs.

14. A method according to claim 13, the method including transferring the manipulated data to one or more components in accordance with the defined component combination.

15. A method according to claim 1, the method including causing the base station to:
a) Determine performance information, the performance information being representative of one or more criteria regarding the implementation of the components by the respective entities; and,
b) Provide the performance information to the user, the user selecting the components in accordance with the performance information.

16. A method according to claim 15, the performance information including at least one of:
a) An indication of the entity implementing the component;
b) An indication of the geographical location of the entity;
c) An indication of the duration for implementing the component;
d) An indication of a cost associated with implementing the respective component; and,
e) A rating, the rating being indicative of the success of the component.

17. A method according to claim 15, the method including a number of different components for performing equivalent service portions, the different components being provided by different entities to thereby allow competition between the entities to drive improvement of the components.

18. A method according to claim 1, the method including generating revenue by charging a fee for the use of each component.

19. A method according to claim 18, the method including:
a) Providing at least some of the revenue to the entity implementing the respective component; and,
b) Having an operator of the base station retain at least some of the revenue.

20. A system for allowing a user to obtain a service, the service being implemented using components, each component corresponding to a respective service portion performed by a respective entity, the system including a processing system adapted to perform the method of claim 1.

21. A computer program product for allowing a user to obtain a service, the service being implemented using components, each component corresponding to a respective service portion performed by a respective entity, the computer program product including computer executable code which when executed on a suitable processing system causes the processing system to perform the method of claim 1.

22. A method of providing a service portion embodied in a component using a processing system, the component including one or more inputs for receiving data and one or more outputs for outputting data, the method including causing the processing system to:
a) Receive a service request, the service request including an indication of interconnections between inputs and/or outputs of the component and inputs and/or outputs of other components, each interconnections representing transfer of data between an entity for performing the service portion and another entity associated with one of the other components and being defined between at least one of:
  i) One or more of the outputs of the component and one or more inputs of the one of the other components; and,
  ii) One or more of the inputs of the component and one or more outputs of the one of the other components;
b) Generate a respective component instance in response to the received service request;
c) Obtain any required data via the one or more inputs in accordance with the interconnections indicated in the service request; and,
d) Perform the service portion by causing the data to be manipulated by modifying the data or creating data to provide manipulated data, wherein the component processing system causes the data to be manipulated by:
  i) Generating further service requests for each of a number of sub-components associated with the component;
  ii) Transferring the further service requests to respective component processing systems to cause the sub-components to be implemented, at least some of the sub-components causing the data to be manipulated; and,
  iii) Receiving the manipulated data from at least one of the sub-components;
e) Outputting the manipulated data via the one or more outputs in accordance with the interconnections indicated in the service request.

23. A method according to claim 22, the method including causing the processing system to perform the service portion using at least one of:
  a) A predetermined process; and,
  b) Input commands received from an operator.

24. Apparatus for providing a service portion embodied in a component, the apparatus including a processing system adapted to perform the method of claim 22.

25. A computer program product for providing a service portion embodied in a component, the computer program product including computer executable code which when executed on a suitable processing system causes the processing system to perform the method of claim 22.

* * * * *